US010619880B2

(12) United States Patent
Ritmanich et al.

(10) Patent No.: US 10,619,880 B2
(45) Date of Patent: Apr. 14, 2020

(54) MASTERLESS AIR HANDLER UNIT (AHU) CONTROLLER SYSTEM

(71) Applicant: Johnson Controls Technology Company, Auburn Hills, MI (US)

(72) Inventors: Kraig D. Ritmanich, Brookfield, WI (US); Christopher R. Amundson, Grafton, WI (US); Aron M. Seiler, White Hall, MD (US)

(73) Assignee: Johnson Controls Technology Company, Auburn Hills, MI (US)

( * ) Notice: Subject to any disclaimer, the term of this patent is extended or adjusted under 35 U.S.C. 154(b) by 166 days.

(21) Appl. No.: 15/964,798

(22) Filed: Apr. 27, 2018

(65) Prior Publication Data

US 2019/0331358 A1 Oct. 31, 2019

(51) Int. Cl.
*G06F 19/00* (2018.01)
*F24F 11/54* (2018.01)
*G05D 23/19* (2006.01)
*F24F 11/46* (2018.01)
*F24F 11/58* (2018.01)
*F24F 110/10* (2018.01)

(52) U.S. Cl.
CPC ............. *F24F 11/54* (2018.01); *F24F 11/46* (2018.01); *F24F 11/58* (2018.01); *G05D 23/1904* (2013.01); *G05D 23/1934* (2013.01); *F24F 2110/10* (2018.01)

(58) Field of Classification Search
CPC ... G06F 19/326; G06F 19/3456; G16B 20/00; G16B 25/00; G16H 20/10; G16H 50/20; G16H 70/00; Y02A 90/26; F24F 11/46; F24F 11/54; F24F 11/58; F24F 2110/10; G05D 23/1904; G05D 23/1934
See application file for complete search history.

(56) References Cited

U.S. PATENT DOCUMENTS

| 4,387,425 | A | 6/1983 | El-Gohary |
| 4,638,311 | A | 1/1987 | Gerety |
| 5,316,073 | A | 5/1994 | Klaus et al. |
| 6,606,871 | B2 | 8/2003 | Butcher et al. |
| 6,612,121 | B2 * | 9/2003 | Moon ............. F24F 3/065 62/175 |
| 7,058,457 | B2 | 6/2006 | Kuwahara et al. |
| 7,377,120 | B2 | 5/2008 | Zikes |
| 7,506,617 | B2 | 3/2009 | Paine |

(Continued)

*Primary Examiner* — Kidest Bahta
(74) *Attorney, Agent, or Firm* — Foley & Lardner LLP

(57) ABSTRACT

A masterless building device system for controlling an environmental condition of a building, includes a first building device and a second building device. The first building device includes a first processing circuit configured to determine, via a first sensor of the first building device, a first environmental condition value of the environmental condition. The first processing circuit is configured to broadcast the first environmental condition value to a second building device via a network. The first processing circuit is configured to receive, via the network, a second environmental condition value broadcast by the second building device, generate a calculated environmental condition value based on the first environmental condition value and the second environmental condition value, and control the environmental condition based on the calculated environmental condition value.

20 Claims, 14 Drawing Sheets

(56) References Cited

U.S. PATENT DOCUMENTS

| | | |
|---|---|---|
| 7,809,472 B1 | 10/2010 | Silva et al. |
| 8,965,584 B2 | 2/2015 | Deivasigamani et al. |
| 9,244,471 B2 | 1/2016 | Watts et al. |
| 9,292,021 B2 | 3/2016 | Joshi |
| 2006/0150648 A1* | 7/2006 | Jang ............... F25B 13/00 62/200 |
| 2007/0005191 A1* | 1/2007 | Sloup ............. G05B 13/041 700/276 |
| 2011/0225997 A1* | 9/2011 | Gast, Jr. ........... F28F 27/003 62/121 |
| 2012/0158350 A1* | 6/2012 | Steinberg ........... F24F 11/62 702/130 |
| 2013/0116835 A1* | 5/2013 | Nowel ............. F24F 11/30 700/278 |
| 2014/0365017 A1 | 12/2014 | Hanna et al. |

\* cited by examiner

MASTERLESS AIR HANDLER UNIT (AHU) CONTROLLER SYSTEM

BACKGROUND

The present disclosure relates generally to heating, ventilation, and air conditioning (HVAC) systems. The present disclosure relates more particularly to controlling air handler units (AHUs) to heat or cool buildings.

A building can include an airside system including an AHU and multiple variable air volume units (VAVs). The AHU can heat or cool air and provide the heated or cooled air to the VAV units via a supply duct. In some circumstances, multiple AHUs can control a single supply duct. When multiple AHUs control a single supply duct, one of the AHUs can act as a master AHU and control the other AHUs. However, if the master AHU fails, the other AHUs will also fail. Furthermore, to add a new AHU to a multiple AHU system, the new AHU must be integrated with the master AHU so that the master AHU can communicate and control the new AHU.

SUMMARY

One implementation of the present disclosure is a masterless building device system for controlling an environmental condition of a building. The system includes a first building device including a first processing circuit configured to determine, via a first sensor of the first building device, a first environmental condition value of the environmental condition and broadcast the first environmental condition value to a second building device via a network. The processing circuit is configured to receive, via the network, a second environmental condition value broadcast by the second building device, generate a calculated environmental condition value based on the first environmental condition value and the second environmental condition value, and control the environmental condition based on the calculated environmental condition value. The system includes the second building device including a second processing circuit. The second processing circuit is configured to determine, via a second sensor of the second building device, the second environmental condition value of the environmental condition and broadcast the second environmental condition value to the first building device via the network. The second processing circuit is configured to receive, via the network, the first environmental condition value broadcast by the first building device, generate the calculated environmental condition value based on the first environmental condition value and the second environmental condition value, and control the environmental condition based on the calculated environmental condition value.

In some embodiments, the first processing circuit is configured to generate the calculated environmental condition value by averaging the first environmental condition value and the second environmental condition value.

In some embodiments, the network is a token network where a token is passed between the first processing circuit and the second processing circuit, where the first processing circuit and the second processing circuit are configured to broadcast messages on the network in response to receiving the token. In some embodiments, the first processing circuit is configured to broadcast the first environmental condition value to the second building device via the network by marking a message including the first environmental condition value as high priority and adding the message to a message queue including other messages, receiving the token via the network, and broadcasting the message via the network before broadcasting the other messages via the network in response to determining that the message is marked as high priority and in response to receiving the token.

In some embodiments, the first processing circuit is configured to receive, via the network, the second environmental condition value broadcast by the second building device by receiving the second environmental condition value of the second building device via a broadcast and determining whether a group identifier of the broadcast matches a group identifier of the first building device. In some embodiments, the first processing circuit is configured to generate the calculated environmental condition value based on the second environmental condition value in response to determining that the group identifier of the broadcast matches the group identifier of the first building device.

In some embodiments, the first building device is a first air handler unit (AHU) and the second building device is a second AHU.

In some embodiments, the first processing circuit is configured to receive an indication that the first AHU has been activated, receive, via the network, a supply fan amount broadcast by the second AHU, and generate a calculated supply fan amount based on the received supply fan amount and one or more other supply fan amounts received from other AHUs. In some embodiments, the first processing circuit is configured to ramp a speed of a supply fan of the first AHU to the calculated supply fan amount over a time period without performing a control process and perform the control process in response to determining that the speed of the supply fan has reached the calculated supply fan amount.

In some embodiments, the first processing circuit is configured to receive a first setpoint value for the environmental condition and generate a timestamp for the first setpoint value based on a time at which the first setpoint value is received and broadcast the first setpoint value to the second building device via the network. In some embodiments, the first processing circuit is configured to receive, via the network a second setpoint value broadcast by the second building device and generate a second timestamp for the second setpoint based on a time at which the second setpoint value is received and select a most recent setpoint value from the first setpoint value and the second setpoint value based on the first time stamp of the first setpoint value and the second timestamp of the second setpoint values. In some embodiments, the first processing circuit is configured to control an actuator of the first building device to control the environmental condition based on the calculated environmental condition value and the selected most recent setpoint value.

In some embodiments, the environmental condition includes a pressure of a supply duct of the building and the setpoint includes a supply duct pressure setpoint. In some embodiments, the first building device is a first roof top unit (RTU) located on a rooftop of the building and the second building device is a second RTU located on the rooftop of the building.

Another implementation of the present disclosure is a first building device of a building for operating in a masterless building device system including one or more second building device. The first building device includes an actuator configured to control an environmental condition of the building, a sensor configured to sense the environmental condition of the building, and a controller including a processing circuit. The processing circuit is configured to determine, via the sensor, a first environmental condition value of the environmental condition and broadcast the first environmental condition value to the one or more second building devices via a network, where the one or more second building devices are each configured to control the environmental condition based on the broadcasted first environmental condition value. The processing circuit is configured to receive, via the network, one or more second environmental condition values broadcast by the one or more second building devices, generate a calculated environmental condition value based on the first environmental condition value and the one or more second environmental condition values, and control the actuator based on the calculated environmental condition value to control the environmental condition of the building.

In some embodiments, the processing circuit is configured to generate the calculated environmental condition value by averaging the first environmental condition value and the received one or more second environmental condition values broadcast by the one or more second building devices.

In some embodiments, the processing circuit is configured to broadcast the first environmental condition value to the one or more second building devices via the network by broadcasting the first environmental condition values at a broadcast rate, where the broadcast rate is the same as or less than a control process execution rate, where the control process execution rate indicates the rate at which the processing circuit is configured to generate a control output for controlling the actuators based on the calculated environmental condition value.

In some embodiments, the processing circuit is configured to generate a time stamp for each of the one or more second environmental condition values based on when each of the one or more second environmental condition values is received and determine whether the received one or more second environmental condition values are reliable based on whether a predefined length of time has passed since receiving the one or more second environmental condition values determined based on the time stamp for each of the one or more second environmental condition values, where the one or more reliable second environmental condition values are the one or more second environmental condition values for which the predefined length of time has not passed. In some embodiments, the processing circuit is configured to generate the calculated environmental condition value based on the first environmental condition value and the one or more reliable second environmental condition values.

In some embodiments, the processing circuit is configured to broadcast the first environmental condition value to the one or more second building devices via the network without transmitting the first environmental condition value directly to the one or more second building devices based on addresses of the one or more second building devices. In some embodiments, the processing circuit is configured to broadcast the first environmental condition value to the one or more second building devices with a group identifier, where the group identifier identifies a group of building devices including the first building device and the one or more second building devices, where the group identifier differentiates the broadcast from other communication messages of the network of other systems.

In some embodiments, the one or more second building devices receive the broadcasted first environmental condition value at substantially the same time.

In some embodiments, the first building device is a first air handler unit (AHU), the controller is an AHU controller, the actuator is an AHU actuator, and the sensor is an AHU sensor. In some embodiments, the one or more second building devices are one or more second AHUs, where the first AHU and the one or more second AHUs are configured to simultaneously control a supply duct of the building.

In some embodiments, the AHU actuator includes a supply fan connected to the supply duct. In some embodiments, the processing circuit is configured to receive an indication that the AHU controller has been activated, receive, via the network, one or more supply fan amounts broadcast by the one or more second AHUs, generate a calculated supply fan amount based on the received one or more supply fan amounts, ramp a speed of the supply fan to the calculated supply fan amount over a time period without performing a control process of the AHU controller, and perform the control process of the AHU controller in response to determining that the speed of the supply fan has reached the calculated supply fan amount.

In some embodiments, the processing circuit is configured to receive a first setpoint value for the environmental condition and generate a timestamp for the first setpoint value based on a time at which the first setpoint value is received and broadcast the first setpoint value to the one or more second AHUs via the network. In some embodiments, the processing circuit is configured to receive, via the network one or more second setpoint values broadcast by the one or more second AHUs and generate one or more timestamps for each of the one or more second setpoints based on a time at which the one or more second setpoint values are received and select a most recent setpoint value from the first setpoint value and the one or more second setpoint values based on the time stamp of the first setpoint value and the one or more timestamps of the one or more second setpoint values of the one or more second AHUs. In some embodiments, the processing circuit is configured to control the AHU actuator to control the environmental condition based on the calculated environmental condition value and the selected most recent setpoint value.

Another implementation of the present disclosure is a method for controlling an environmental condition of a building by a first building device of a masterless building device system. The method includes determining, by the first building device via a sensor of the first building device, a first environmental condition value of the environmental condition and broadcasting, by the first building device, the first environmental condition value to one or more second building devices of the masterless building device system via a network, where the one or more second building devices are each configured to control the environmental condition based on the broadcasted first environmental condition value. The method includes receiving, by the first building device via the network, one or more second environmental condition values broadcast by the one or more second building devices and generating, by the first building device, a calculated environmental condition value based on the first environmental condition value and the one or more second environmental condition values. The method further includes controlling, by the first building device, an actuator of the first building device based on the calculated environmental condition value to control the environmental condition of the building.

In some embodiments, the method further includes generating, by the first building device, a time stamp for each of the one or more second environmental condition values based on when each of the one or more second environmental condition values is received. In some embodiments, the method includes determining, by the first building device, whether the received one or more second environmental condition values are reliable based on whether a predefined length of time has passed since receiving the one or more second environmental condition values determined based on the time stamp for each of the one or more second environmental condition values, where the one or more reliable second environmental condition values are the one or more second environmental condition values for which the predefined length of time has not passed. In some embodiments, the method includes generating, by the first building device, the calculated environmental condition value based on the first environmental condition value and the one or more reliable second environmental condition values.

In some embodiments, the method further includes receiving, by the first building device, an indication that the first building device has been activated, receiving, by the first building device via the network, one or more supply fan amounts broadcast by the one or more second building devices, generating, by the first building device, a calculated supply fan amount based on the received one or more supply fan amounts, ramping, by the first building device, a speed of the supply fan to the calculated supply fan amount over a time period without performing a control process, and performing, by the first building device, the control process in response to determining that the speed of the supply fan has reached the calculated supply fan amount.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Overview

Figure 1:
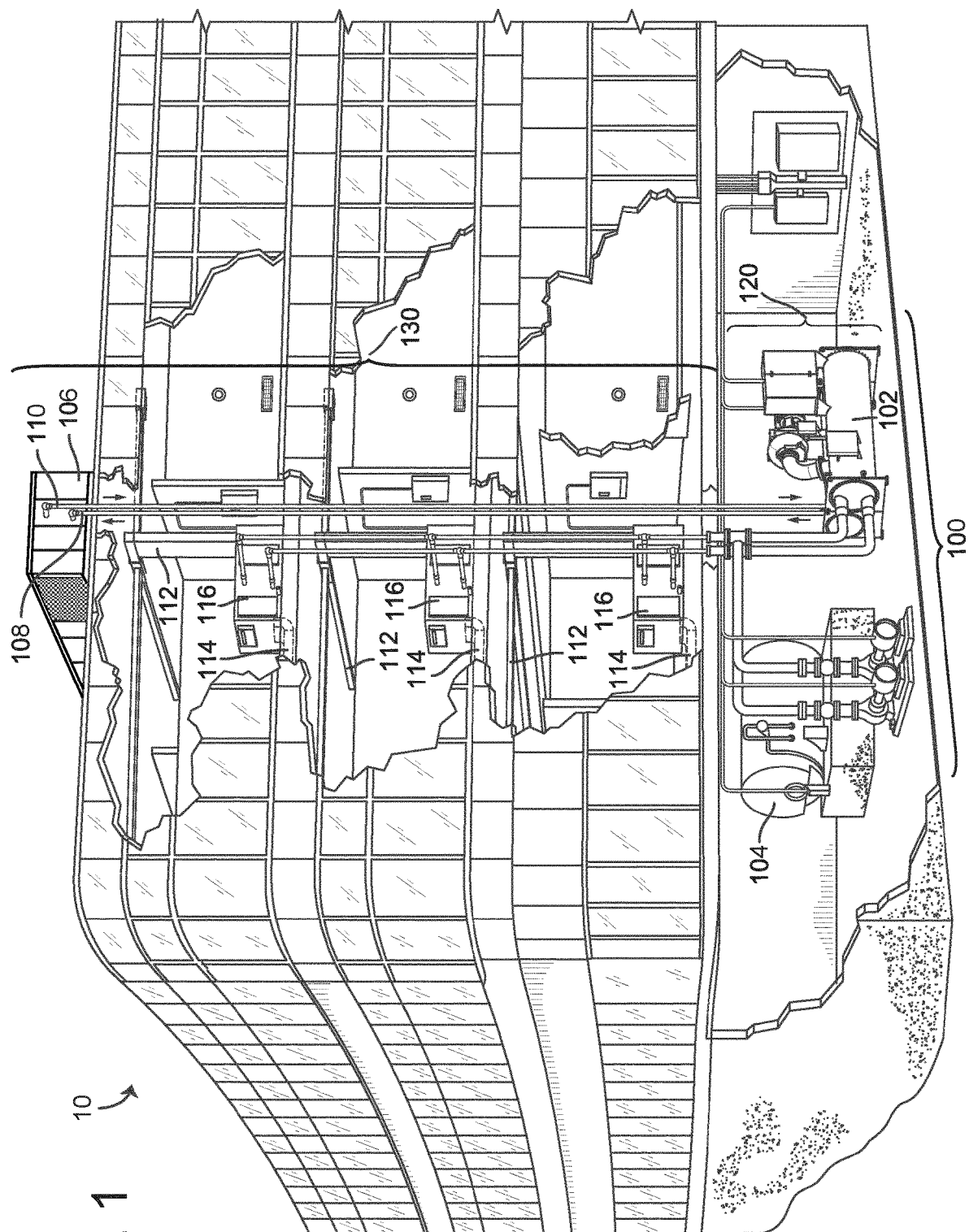
FIG. 1 is a drawing of a building equipped with a HVAC system, according to an exemplary embodiment.

Referring generally to the FIGURES, a masterless AHU controller system is shown, according to various exemplary embodiments. The masterless AHU controller system can include multiple AHU controllers each associated with an AHU. The AHU controllers can be configured to work together to heat and/or cool a building. The masterless AHU controller system can implement a peer to peer control strategy that allows the AHU controllers to share AHU data among each other and independently make complimentary control decisions. This coordination of the AHU controllers may not require additional hardware, a dedicated master controller, or any other supplemental building automation system (BAS) device.

In the masterless AHU controller system, each AHU controller can be configured to receive perfect knowledge (or near perfect knowledge) of a system that the AHU controllers are configured to control. Based on the system knowledge, each AHU controller can execute the same control process independently and can take actions on their own rather than waiting to be directed to take action by a master. Each AHU controller can be configured to broadcast its data on a network, thus making the data for the AHU controllers available to the entire group of AHU controllers. Each AHU controller can store the broadcast data, combine the broadcast data (e.g., average, take the most recent value, take the greatest or least value) with its own local value, and utilize the combined data in a control application for controlling the AHU. In some embodiments, where the network is a Building Automation Control Network (BACnet), unconfirmed COV notifications can be used by the AHU controllers to share the AHU data on the BACnet network so that overhead messages (e.g., handshakes) or direct addressing of devices is not required.

In some embodiments, multiple AHU controllers can be configured to communicate, via dedicated hardwiring, input and output data between one or more AHU controllers. Furthermore, in such systems often, data objects are bound between controllers through the use of off-box references or change of value (COV) subscriptions. Setting up these links and additional hardware (e.g., the dedicated wiring) may increase the amount of hardware and/or resource intensive code required to operate the AHUs in a multi AHU system. However, by utilizing a shared communication channel, e.g., a BAS network, the AHU controllers can each broadcast their AHU data among the entire group of AHU controllers without requiring specific point subscriptions, message addressing, or dedicated hardwiring. By removing the unnecessary code and allowing the AHU controllers to share data, the resource requirements (e.g., processing power, memory requirements) can be lowered and the processing speed of the AHU controllers can be increased.

By sharing data via the masterless AHU controller system, redundant data (e.g., redundant sensor inputs, redundant actuator outputs) can be established so that a single point of failure (e.g., a sensor becoming unreliable) does not cause any disruption in control by the masterless AHU controller system. Furthermore, if the broadcast messages of the masterless AHU controller system were to fail, e.g., the network crash, each AHU controller could continue to operate on its own collected data independent of the other AHU controllers. Furthermore, the masterless AHU controller system can be easy to configure and/or commission, can have quick response time to system changes, and be implemented with less complex software resulting in quicker development time, testing, and fewer software defects. Each AHU controller can have a quick response time to fluctuations in environmental conditions since each AHU controller responds directly to the data it currently has and does not need to wait to receive a control command from a master controller.

The AHU data that the controllers can be configured to share can include unit specific data, required system data, and optional system data. The unit specific data may be data of a sensor for a particular unit, e.g., a sensor located within the unit that is specific to the unit. For example, an internal unit temperature could be a unit specific value. The system data can include data for a commonly monitored condition. For example, a sensor that monitors a supply duct temperature can be data measured by multiple AHU units. This measured data may be system specific and may be necessary for standard operation of a system. System data can be shared in the masterless control system and provide redundancy when a unit loses a sensor value and allows that unit to continue operating. The AHUs can be sized so that all the AHUs operating together can meet a worst case demand of the building. Twinning the AHUs together can provide redundancy by sharing critical system sensor data between the AHUs and allowing a unit with a faulty sensor to operate using the shared sensor data instead of its own local sensor data.

Optional system data can be data that a sensor of an AHU monitors that is an optional feature of a system. Optional system-specific sensors can be shared in the masterless control system. Examples of these types of sensors include Outdoor Air Quality, Return Air Quality, Zone Temperature, Zone Humidity, etc. The masterless AHU controller system can allow an optional feature on of one AHU to be shared among the other AHUs so that all the AHU controllers of the system can benefit of the optional system data.

Since the AHU controllers share data among each other via broadcasts, the number of AHU controllers in the masterless AHU controller system can increase or decrease without affecting the performance of the masterless AHU controller system. In order to integrate one AHU into a system of multiple AHUs, the AHU controllers can be configured to perform a load ramping functionality. This load ramping functionality can efficiently add new AHU controllers to the masterless AHU controller system. For example, for a system of three AHU controllers, when a fourth unit is powered on, the AHU system may already be satisfied and the fourth unit might operate at minimum requirements, e.g., a minimum fan speed. Having the three AHU controllers operate at high loads and the fourth AHU controller is inefficient since the system load is not evenly distributed across all four units. For this reason, when the fourth unit is powered on, it can ramp up its fan speed based on a shared "Supply Fan Command" received from the other AHU controllers of the system. After the Supply Fan Command is reached, the AHU controller can operate a control process based on shared AHU data. Performing the ramping before operating the control process can integrate the fourth AHU controller into the system causing the system load to be evenly distributed.

While the systems and methods discussed herein are discussed with reference to AHUs, the systems and methods can be applied to masterless control systems for chillers, boilers, multi-pump systems, multi-fan systems, multi-compressor systems, and/or any other HVAC system where multiple devices work together to control an environmental condition.

Building Management System and HVAC System

Figure 2:
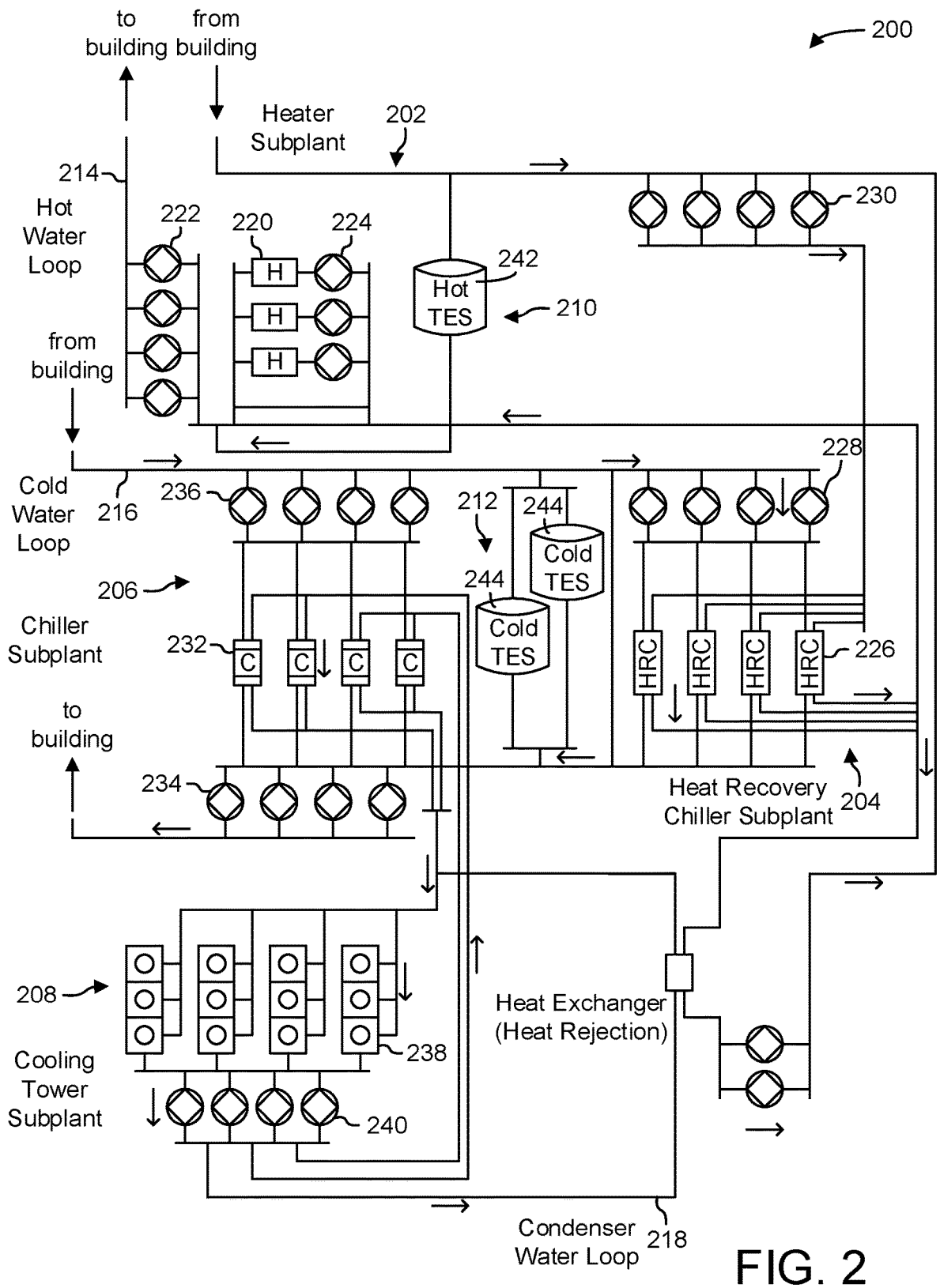
FIG. 2 is a block diagram of a waterside system that may be used in conjunction with the building of FIG. 1, according to an exemplary embodiment.
Figure 3:
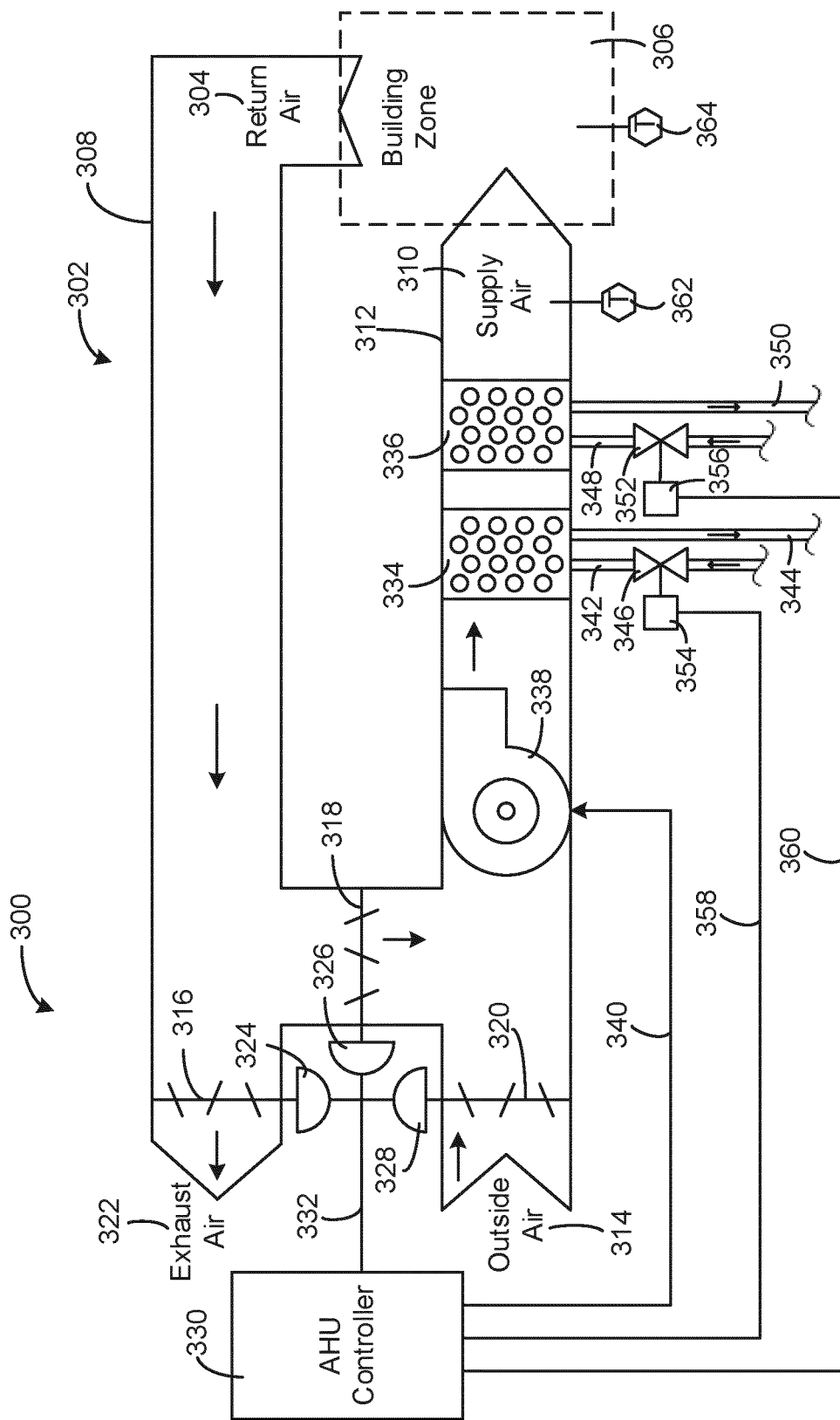
FIG. 3 is a block diagram of an airside system that may be used in conjunction with the building of FIG. 1, according to an exemplary embodiment.

Referring now to FIGS. 1-3, an exemplary building management system (BMS) and HVAC system in which the systems and methods of the present invention can be implemented are shown, according to an exemplary embodiment. Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes an HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 can provide a heated or chilled fluid to an air handling unit of airside system 130. Airside system 130 can use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 can use boiler 104 and chiller 102 to heat or cool a working fluid (e.g., water, glycol, etc.) and can circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 can add heat to the circulated fluid, for example, by burning a combustible material (e.g., natural gas) or using an electric heating element. Chiller 102 can place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 can place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 can transfer heat between the airflow and the working fluid to provide heating or cooling for the airflow. For example, AHU 106 can include one or more fans or blowers configured to pass the airflow over or through a heat exchanger containing the working fluid. The working fluid can then return to chiller 102 or boiler 104 via piping 110.

Airside system 130 can deliver the airflow supplied by AHU 106 (i.e., the supply airflow) to building 10 via air supply ducts 112 and can provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 can receive input from sensors located within AHU 106 and/or within the building zone and can adjust the flow rate, temperature, or other attributes of the supply airflow through AHU 106 to achieve set-point conditions for the building zone.

Referring now to FIG. 2, a block diagram of a waterside system 200 is shown, according to an exemplary embodiment. In various embodiments, waterside system 200 can supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and can operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve the thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 can absorb heat from the cold water in chiller subplant 206 and reject the absorbed heat in cooling tower subplant 208 or transfer the absorbed heat to hot water loop 214. Hot TES subplant 210 and cold TES subplant 212 can store hot and cold thermal energy, respectively, for subsequent use.

Hot water loop 214 and cold water loop 216 can deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, $CO_2$, etc.) can be used in place of or in addition to water to serve the thermal energy loads. In other embodiments, subplants 202-212 can provide heating and/or cooling directly to the building or campus without requiring an intermediate heat transfer fluid. These and other variations to waterside system 200 are within the teachings of the present invention.

Each of subplants 202-212 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 can also include one or more pumps or valves configured to control the flow rate of the hot water into or out of hot TES tank 242. Cold TES subplant 212 is shown to include cold TES tanks 244 configured to store the cold water for later use. Cold TES subplant 212 can also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Referring now to FIG. 3, a block diagram of an airside system 300 is shown, according to an exemplary embodiment. In various embodiments, airside system 300 can supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 can operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 can receive return air 304 from building zone 306 via return air duct 308 and can deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust air damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 can communicate with an AHU controller 330 via a communications link 332. Actuators 324-328 can receive control signals from AHU controller 330 and can provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 can communicate with fan 338 via communications link 340 to control a flow rate of supply air 310. In some embodiments, AHU controller 330 controls an amount of heating or cooling applied to supply air 310 by modulating a speed of fan 338.

Cooling coil 334 can receive a chilled fluid from waterside system 200 (e.g., from cold water loop 216) via piping 342 and can return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 can receive a heated fluid from waterside system 200 (e.g., from hot water loop 214) via piping 348 and can return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 can communicate with AHU controller 330 via communications links 358-360. Actuators 354-356 can receive control signals from AHU controller 330 and can provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 can also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a set-point temperature for supply air 310 or to maintain the temperature of supply air 310 within a set-point temperature range). The positions of valves 346 and 352 affect the amount of heating or cooling provided to supply air 310 by cooling coil 334 or heating coil 336 and may correlate with the amount of energy consumed to achieve a desired supply air temperature. AHU controller 330 can control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 can communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, set-points, operating boundaries, etc.) and provides information to BMS controller 366 (e.g., temperature measurements, valve or actuator positions, operating statuses, diagnostics, etc.). For example, AHU controller 330 can provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 can communicate with BMS controller 366 and/or AHU controller 330 via communications link 372.

Masterless AHU Controller System

Figure 4:
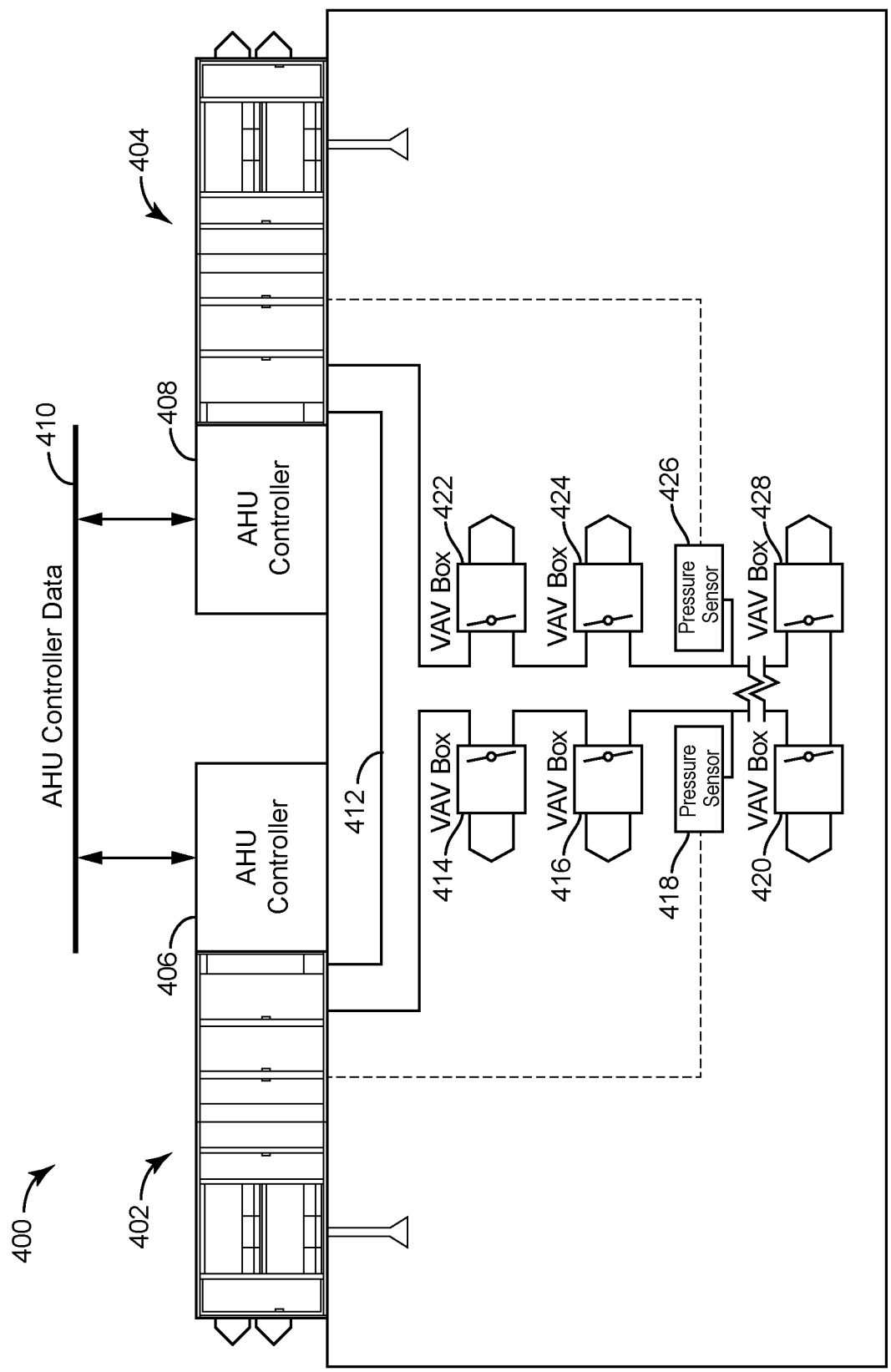
FIG. 4 is a drawing of a masterless AHU controller system including an AHU controller for a first AHU and second AHU controller for a second AHU, according to an exemplary embodiment.

Referring now to FIG. 4, a masterless AHU controller system 400 is shown, according to an exemplary embodiment. Two AHUs are shown in FIG. 4, AHU 402 and AHU 404. While only two AHUs are shown in FIG. 4, any number of AHUs can be implemented in the masterless AHU controller system 400. The AHUs 402 and 404 can be the same and/or similar. Furthermore, the AHUs 402 and 404 can be the same and/or similar to the AHU 102 as described with reference to FIG. 1 and/or the AHU 302 as described with reference to FIG. 3. Each of the AHUs 402 and 404 can be controlled by an AHU controller. The AHU 402 is shown to be controlled by the AHU controller 406 while the AHU controller 408 is shown to control the AHU 404. The AHU controllers 406 and 408 can be the same and/or similar to the AHU controller 330 as described with reference to FIG. 3.

The AHU 402 and the AHU 404 can be "twinned," i.e., both the AHU 402 and the AHU 404 can be configured to control a shared supply duct, supply duct 412. The supply duct 412 can be the same and/or similar to the supply duct 112 and/or the supply air duct 312 as described with reference to FIGS. 1 and 3. The AHUs 402 and 404 can operate together with their own or shared supply fan, economizer, and exhaust/return fans. The AHU 402 and the AHU 404 can be configured to operate with underfloor air systems, e.g., FLEXSYS® systems. Return air bypass dampers and associated filter and devices for hydronic or electric heat may be internal to each of the AHUs 402 and 404.

Often, multiple AHUs (or roof top units (RTUs)), are required to control a single supply duct. Rather than controlling the AHUs 402 and 404 with a master-slave approach, the masterless AHU controller system 400 can share AHU data among the AHU controllers 406 and 408 so that the AHU controller 406 and the AHU controller 408 can independently perform control operations.

The AHU controller 406 can include and/or communicate with various sensors. As an example, the AHU controller 406 is shown to communicate with a pressure sensor 418. The AHU controller 406 can be configured to receive a pressure reading for the supply duct 412 from the pressure sensor 418. In a similar manner, the AHU controller 408 can receive a duct pressure sensor value from the pressure sensor 426. The AHU controllers 406 and/or 408 can share the measured data among each other via a network 410.

The network 410 can be a BACnet network (e.g., a BACnet Master Slave Token Passing (MSTP) or BACnet Internet Protocol (IP) network). The BACnet network can be implemented over RS-485, RS-232, Ethernet, Wireless communication, etc. In some embodiments, the network 410 is a LON network, a CAN network, and/or any other type of network. The network 410 can be a wide area network (WAN) (e.g., the Internet), a local area network (LAN), or a metropolitan area network (MAN). In some embodiments, the network 410 communicatively couples the devices, systems, and servers of system 400. In some embodiments, the network 410 is at least one of and/or a combination of a Wi-Fi network, a wired Ethernet network, a ZigBee network, a Bluetooth network, and/or any other wireless network. The network 410 may be a local area network and/or a wide area network (e.g., the Internet, a building WAN, etc.) and may use a variety of communication protocols. The network 410 can include routers, modems, and/or network switches. The network 410 may be a combination of wired and wireless networks.

VAV units 414, 416, 420, 422, 424, and 428 are shown in FIG. 4. The VAV units can be connected to the supply duct 412 and can be configured to adjust the amount of air delivered to various areas of a building (e.g., the building 10). The VAV units may be the same and/or similar to the VAV units 116 of FIG. 1. The VAV units can include an actuator configured to adjust a damper to vary the amount of air flow into a particular zone. The VAV units may include a controller configured to measure an air pressure of the supply duct 412 and control the actuator based on the measured air pressure and a setpoint. This control can allow various amounts of heating or cooling to occur in various areas of the building.

If the AHU controller 406 and/or 408 both have perfect knowledge of the airside system of FIG. 4 (e.g., the airside system including the AHUs 402 and 404, the supply duct 412, the VAV units 414, 416, 420, 422, 424, and 428) (or near perfect knowledge), then the AHU controller 406 and/or the AHU controller 408 can perform the same and/or a similar control process independently of each other without waiting for directions to be received from a master controller. The AHU controllers 406 and 408 may form a group. This group may be identified via a group identifier (ID) that each of the AHU controllers 406 and 408 can store in a memory device and include in messages communicated via the network 410. Furthermore, each AHU controller 406 and/or 408 may be identified via a device ID that each of the AHU controllers 406 and 408 can store in a memory device and include in messages communicated via the network 410. The AHU controllers 406 and 408 can use the identifiers to identify AHU data communicated via the network 410 that should be used in performing control processes.

The AHU data broadcasts of the AHU controllers 406 and 408 can be sent at a period dependent on the performance of the control system, i.e., how fast the control system needs to react. For example, supply fan static pressure control may be a fast control loop that an AHU of FIG. 4 performs. The period of the control loop may be one update per second. For this reason, the AHU controllers 406 and 408 can broadcast a static pressure present value and a reliability for the value at the one second period (or more frequent that one broadcast per second). Other objects (e.g., present value and reliability pairs) that have the same broadcast rate can be packaged with the static pressure object and can be broadcast together.

The AHU controllers 406 and 408 can be configured to listen to the network 410 for a broadcast of AHU data including a particular group ID. AHU broadcast data that includes the group ID can be added to a group data table by the AHU controllers 406 and 408. The group data table can also contain a timestamp which can be updated when a broadcast is received. This serves as a heartbeat for the table entry and a device can be assumed to be offline and its objects unreliable if this timestamp exceeds a specified threshold. The execution of the control process (e.g., a proportional integral derivative (PID) control algorithm) may not be synchronized with broadcasts from the network 410, so there may be a small difference between the outputs of the control processes of the AHU controllers 406 and 408 at a particular instant in time. However, these differences may be minimal and may not alter the performance of the masterless AHU controller system 400. Furthermore, a master-slave system might include the same differences since changes of a control process would be sent in individual messages to each of the AHU controllers 406 and 408 which would not have the same simultaneous delivery time.

As shown in FIG. 4, the AHU controllers 406 and 408 can communicate AHU controller data among each other. In various embodiments, the AHU controllers 406 and 408 broadcast the AHU controller data so that the other AHU controller can receive the AHU data without requiring direct message communication (e.g., handshakes, responses, etc.). This can ensure that all devices of the masterless AHU controller system receive data at the same time. The AHU controller data may be setpoint data, pressure data (e.g., pressure data measured via the pressure sensors 418 and 426), setpoint data, occupancy schedules, and/or other AHU data. As an example, the AHU controller 406 can measure a "Duct Pressure A" via the pressure sensor 418 and may receive a "Setpoint C" for the duct pressure. The Duct Pressure A may be associated with a first time stamp, "Time Stamp A" while the Setpoint C may be associated with a "Time Stamp C." The time stamps can be associated with a time which the data was created, measured, and/or received. Similarly, the AHU controller 408 can be associated with "Duct Pressure B" and "Setpoint D" and corresponding time stamps "Time Stamp B" and "Time Stamp D."

The AHU data of the AHU controller 406 and AHU controller 408 can be shared via the network 410. Based on the shared AHU data, both the AHU controller 406 and the AHU controller 408 can store their own respective data and data for the other AHU controller. An example of the data that could be stored by both of the AHU controllers 406 and 408 is provided below in Table 1.

TABLE 1

| AHU Controller Group Data | | |
| AHU Controller Group Data | | |
| --- | --- | --- |
| Duct Pressure A | Reliability A | Timestamp A |
| Duct Pressure B | Reliability B | Timestamp B |
| Setpoint C | Reliability C | Timestamp C |
| Setpoint D | Reliability D | Timestamp D |

Both the AHU controller 406 and the AHU controller 408 can generate calculated data based on the AHU controller data of the AHU controller 406 and 408. Examples of generating the calculated data based on the AHU controller data can include performing averages, selecting a most recent parameter value, selecting a highest or lowest parameter value, etc. In some embodiments, different data types are associated with different combination operations. For example, duct pressure can be associated with an average operation while setpoint may be associated with a most recently received operation.

If a value of the Table 1 is unreliable, then the AHU controller 406 or 408 may remove the unreliable object from the determination of the calculated value. For example, if a local sensor is unreliable for the AHU controller 406, then the AHU controller 406 can ignore the local sensor and only used shared values. Since the each of the controllers 406 and 408 determine roughly the same control output due to the fact that the AHU data is shared across all of the AHU controllers, the control decisions made by the AHU controller 406 and 408 are complimentary. The complimentary control decisions can balance a system load and prevent the AHUs 402 and 404 from fighting with each other. As an example, if the AHUs 402 and 404 are fighting, the result may be air flow back feeding into one of the AHUs 402 and 404.

The AHU controller 406 (as well as the AHU controller 408), can be configured to generate an average reliable duct pressure value based on the data of the Table 1. The AHU controller 406 can be configured to determine, based on time stamps for the duct pressure values, whether the data is reliable. If the time stamp is less than a predefined amount i.e., the time stamp was taken a predefined amount of time in the past, the data may be reliable. In this regard, the AHU controller 406 can continuously or periodically update the reliability values of the Table 1. Furthermore, based on the timestamps, the AHU controller 406 can be configured to select a most recent setpoint. The setpoint may be a temperature setpoint or a duct pressure setpoint. In some embodiments, the AHU controller 406 can generate a duct pressure setpoint from a temperature setpoint. The AHU controller 406 can be configured to compare the setpoints of the Table 1 against each other, based on their respective time stamps, to select the most recent setpoint. Based on the average supply pressure and the most recent setpoint, the AHU controller 406 can be configured to control the operation of the AHU 402.

Various data values can be shared by the AHU controllers 406 and 408 at different rates based on how frequently the control processes that use the data values execute. As can be seen in Table 2 below, each data value is associated with a particular cyclic rate. In this regard, the AHU controllers 406 and 408 can broadcast messages for each of the objects of Table 2 below at the associated cyclic rate for the object. As can be seen, some of the objects of Table 2 are associated with an "acyclic" rate. These objects may be setpoint objects. Setpoint objects may only be broadcasted whenever a setpoint value is changed. Since the AHU controllers 406 and 408 may operate based on a most recently received setpoint, if a user adjusts a setpoint for one of the AHU controllers 406 and 408, the setpoint change will be immediately propagated to the other AHU controller. This allows for setpoint changes to be made for a group of AHUs by only changing the setpoint for one of the AHUs of the AHU group.

TABLE 2

| AHU Data Objects and Broadcast Rates | | |
| --- | --- | --- |
| System | Object | Broadcast Rate |
| Supply Fan | Static Pressure | 1 second |
| | Static Pressure Setpoint | Acyclic |
| | Supply Fan Percent Command | 3 seconds |
| Economizer | Outdoor Air Temperature (OAT) | 60 seconds |
| | Outdoor Air Humidity (OAH) | 60 seconds |
| | Return Air Temperature (RAT) | 30 seconds |
| | Return Air Humidity (RAH) | 30 seconds |

TABLE 2-continued

AHU Data Objects and Broadcast Rates

| System | Object | Broadcast Rate |
| --- | --- | --- |
| Occupancy | Schedule | Acyclic |
| | Effective Occupancy | Acyclic |
| Demand Controlled Ventilator (DCV) | Indoor Air Quality (IAQ) | 30 seconds |
| | Outdoor Air Quality (OAQ) | 30 seconds |
| | Carbon Dioxide (CO2) Setpoint | Acyclic |
| | Minimum Position Setpoint | Acyclic |
| OA Flow | Flow Setpoint | Acyclic |
| Exhaust Fan | Building Static Pressure | 3 seconds |
| | Building Static Setpoint | Acyclic |
| Smoke Control | Smoke Purge Binary Input (BI) | Acyclic |
| | Priorities | Acyclic |

If one of the AHU controllers 406 and 408 experiences a loss of communication with the other (or with a group of AHU controllers), the AHU controller can be configured to operate as if it is the only AHU controller operating in the system. The AHU controller can operate using only its own measured values and setpoints rather than using the shared values from the other controllers. While this may be inefficient, the system will still be able to control the airside system to satisfy minimum and maximum demands of the system.

Figure 5:
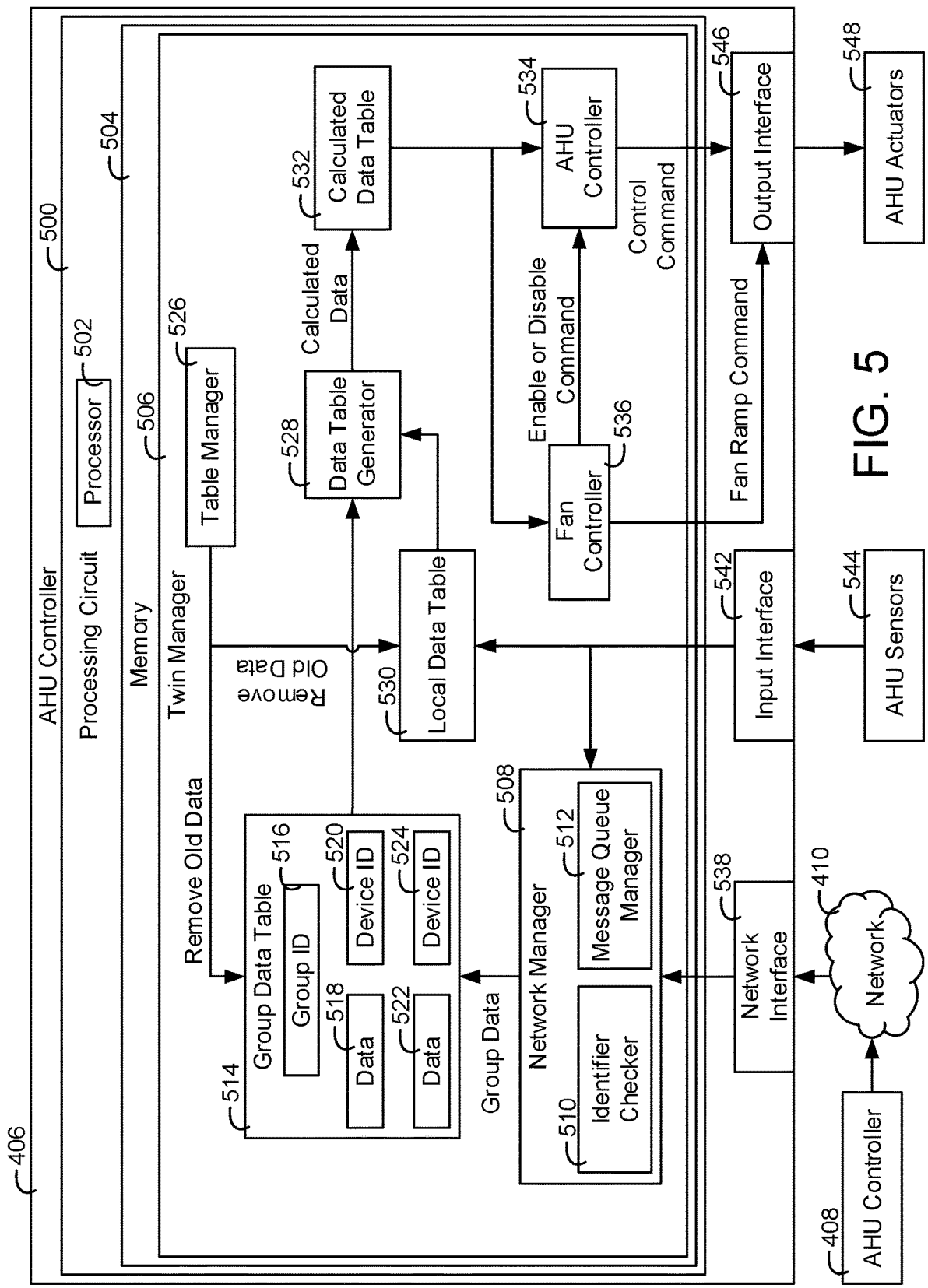
FIG. 5 is a block diagram illustrating one of the AHU controllers of FIG. 4 in greater detail, according to an exemplary embodiment.

Referring now to FIG. 5, a block diagram of the AHU controller 406 of FIG. 4 is shown illustrating the AHU controller 406 in greater detail, according to an exemplary embodiment. The AHU controller 406 is shown to include a processing circuit 500, a network interface 538, an input interface 542, and an output interface 546. The network interface 538 can include one or more circuits, connectors, radios, or other devices configured to allow the AHU controller 406 to communicate (e.g., send, receive, broadcast, subscribe, push, pull, etc.) via network 410.

The network interface 538 may enable the processing circuit 500 to broadcast messages via the network 410 and receive broadcast messages via the network 410. The AHU controller 406 can be configured to utilize broadcast messages instead of directed messages in order to ensure that each controller of the masterless AHU controller system 400 receives the same data at the same time. Furthermore, when more than two AHU controllers are present in the masterless AHU controller system 400, it may be necessary to use broadcast messages to minimize bandwidth usage since the broadcast messages may include less overhead that direct messages. In some embodiments, when the AHU controllers are restricted to a particular subnet (or MSTP bus), the AHU controller 406 can be configured to communicate via local broadcasts to avoid broadcast storms and any unnecessary routing. The AHU controller 406 may not require any specific connections in the network interface 538 for participation in the masterless AHU controller system 400 i.e., the AHU controller 406 can use the network interface 538 for communicating with the devices of the masterless controller system 400 in addition to other sensor devices, actuator devices, and/or controller devices.

The input interface 542 can be a circuit configured to receive data from AHU sensors 544. In some embodiments, the AHU sensors 544 include temperature sensors, pressure sensors, humidity sensors, airflow sensors, air pressure sensors, etc. The input interface 542 can include various circuits required for measuring data from the AHU sensors 544. The input interface 542 can include various circuits, e.g., filtering circuits, voltage dividers, amplifiers, etc. configured to allow the AHU controller 406 to measure data sensed by the AHU sensors 544.

The output interface 546 can be a circuit configured to provide output commands to the AHU actuators 548. The AHU actuators 548 can include fans and blowers (e.g., motors), heating and/or cooling coils, humidifiers, and various other actuators. The output interface 546 can include various control circuits, e.g., switching relays, filters, amplifier circuits, etc. configured to provide an output determined by the processing circuit 500 to the AHU actuators 548.

The processing circuit 500 is shown to include a processor 502 and a memory 504. The processor 502 can be implemented as a general purpose processor, an application specific integrated circuit (ASIC), one or more field programmable gate arrays (FPGAs), a group of processing components, or other suitable electronic processing components. The memory 504 (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present application. The memory 504 can be or include volatile memory and/or non-volatile memory.

The memory 504 can include object code components, script components, or any other type of information structure for supporting the various activities and information structures described in the present application. According to some embodiments, the memory 504 is communicably connected to the processor 502 via the processing circuit 500 and can include computer code for executing (e.g., by the processing circuit 500 and/or the processor 502) one or more processes of functionality described herein.

The memory 504 is shown to include a twin manager 506. The twin manager 506 can be configured to cause the AHU controller 406 to operate the supply duct 412 of FIG. 4 while other AHUs are connected to and are operating. The twin manager 506 can be configured to broadcast AHU data collected from the AHU sensors 544 or received from a user or other controller (e.g., a setpoint) to other AHU controllers (e.g., to the AHU controller 408). Furthermore, the twin manager 506 can be configured to aggregate AHU data received from other AHU controllers and generate control commands for the AHU actuators 548 based on the aggregate data set. Various implementations of the twin manager 506 are described with reference to FIGS. 5-9.

The twin manager 506 is shown to include a network manager 508. The network manager 508 can be configured to facilitate communication between the network 410 and the processing circuit 500. The network manager 508 can be configured to communicate with other AHU controllers of the masterless AHU controller system 400, e.g., the AHU controller 408 via the network interface 538. The network manager 508 can be configured to send broadcast messages to the network 410 for the AHU controller 408 to identify and/or receive. Furthermore, the network manager 508 can be configured to monitor the network 410 for messages broadcast by the AHU controller 408 and receive and store the identified messages.

The network manager 508 can be configured to broadcast local data of the AHU controller 406 to the network 410. In some embodiments, the network manager 508 can broadcast data of the local data table 530 and/or data received via the input interface 542. The network manager 508 can be configured to broadcast data at varying rates. Table 2 above indicates data objects that the network manager 508 can be configured to broadcast to the network 410 and the rate at which the network manager 508 can broadcast the data objects. Broadcasts can be sent at a period dependent on the performance of the control system, i.e., how fast the control system needs to react. For example, a supply static pressure control process may execute every three seconds. Therefore, the AHU controller 406 can broadcast messages including the static pressure values and/or reliability value every three seconds or less.

Each broadcast generated by the network manager 508 may include a group ID and/or a device ID. The group ID can identify the masterless AHU controller system 400 and differentiate the system 400 from other masterless controller systems and communication that may be communicated on the network 410 not pertaining to the masterless AHU controller system 400. The device ID can specifically identify the AHU controller 406 and differentiate the broadcast messages of the AHU controller 406 from other AHU controllers, e.g., the AHU controller 408.

The network manager 508 is shown to include a message queue manager 512. The message queue manager 512 can be configured to maintain and manage a queue of messages to be broadcast to the network 410. In some embodiments, the network 410 is a token based network, e.g., a MSTP based network. In a token based network, a signal is passed between devices referred to as a token. Each device may receive the token at a particular period, referred to as a token time. The device which includes the token is allowed to send data. In this regard, in response to the AHU controller 406 receiving the token, the message queue manager 512 can be configured to broadcast AHU data stored in the message queue to the network 410.

In some embodiments, data for masterless control, e.g., the local data table 530, can be added to a queue of the message queue manager 512 with a high priority indication. In some embodiments, the data can be added to a separate high priority data queue. In this regard, when the network manager 508 receives the token, the message queue manager 512 can be configured to transmit the high priority data to the network 410 before any low priority data. This allows for AHU data for operating the masterless AHU controller system 400 is sent before other less important data.

Data throttling can be realized via this message prioritization and can be necessary so that particular data values can be broadcast at particular rates. For example, a duct static pressure control process can executes every three second and the token time for the network 410 may be not usually exceed three seconds during normal operation of the network 410. Furthermore, the network 410 may include a bus bandwidth limit (e.g., 500 COV messages per minute) and other devices outside of the devices of the masterless AHU controller system 400 can be configured to communicate via the network 410. Therefore, the message prioritization can be used to make sure that when meeting the bus bandwidth limit, the most important data is still communicated between the controllers of the masterless controller system 400.

In some embodiments, if one AHU has a feature that another AHU does not have, this unique data can be shared between all of the AHU controllers. Some values can be shared at a slow rate and other values are shared only when they change (e.g., they are broadcast on a change of value (COV)). Values that can be shared in the masterless AHU controller system 400 are exemplified in Table 3.

The message queue manager 512 can be configured to utilize a flag field to indicate that AHU data has a particular message priority level. The message queue manager 512 can put messages with high priority flags into a high priority message queue. Throttling the transmission of messages by setting priorities can avoid a normal message queue from being filled up. The flag field may include multiple bits (e.g., two bits) that are reserved for indicating priority. The message queue manager 512 can check the priority bits and add the message to a message queue based on the priority. The message queue manager 512 can, when it has received the token, check the high priority queue for messages to broadcast before checking the normal queue.

In some embodiments, the message queue manager 512 can be configured to perform a queue flush to ensure that old data is not being transmitted. If old data has filled a message queue, this may prevent new data from being transmitted. In this regard, the message queue manager 512 can be configured to monitor data in the data queue and discard data that has been in the data queue for a predefined length of time.

The network manager 508 is shown to include an identifier checker 510. The identifier checker 510 can analyze messages broadcast via the network 410 to identify whether the messages are part of the masterless AHU controller system 400. Specifically, the identifier checker 510 can analyze the broadcast messages to identify whether the broadcast messages includes a group ID that corresponds to a group ID of the AHU controller 406. If the group ID of a broadcast message matches the group ID of the AHU controller 406, the identifier checker 510 can be configured to add the data of the broadcast data to the group data table 514. The identifier checker 510 can be configured to add data to the group data table 514 with a timestamp. The timestamp may be the time at which the network manager 508 receives the data via the network 410. This allows the twin manager 506 to identify what data of the group data table 514 is reliable. Data that is associated with a timestamp that occurs before a predefined amount of time in the past can be removed from the group data table 514 and/or marked as unreliable.

In some embodiments, if the AHU controller 406 loses connection with the other AHU controllers of the masterless AHU controller system 400 (e.g., does not receive a broadcast); the network manager 508 may raise an alarm to an end user. The time period used to determine whether the masterless AHU controller system 400 is offline may be a period a predefined amount times an update rate for a value. For an update rate of two seconds, the timeout time period may be 3 times the update rate which results in 6 seconds. The network manager 508 can be configured to cause the AHU controller 534 to operate as if the AHU controller 406 is the only AHU controlling the supply duct 412, e.g., operate based on values of the local data table 530 if the AHU controller 406 has not received data from the AHU controller 408 within a predefined amount of time. Although there may be some loss of efficiency by operating as if the AHU controller 406 is the only active controller even though this is not true, the system demand will still be met.

The twin manager 506 is shown to include the group data table 514. The group data table 514 can include AHU data received via the network 410 from other AHU controllers of the masterless AHU controller system 400. The group data table 514 is shown to be associated with a group ID 516. In this regard, the identifier checker 510 can determine whether a group ID of a broadcast message of the network 410 matches the group ID 516. If the IDs match, the identifier checker 510 can add the data to the group data table 514. The data may be the data 518 and/or the data 522. The data 518 and/or 522 may be the data of the group data table 514 and can be associated with a timestamp indicating when the data was received. Furthermore, the data is shown to be associated with a device ID, the device IDs 520 and 524. The device IDs 520 and/or 524 can be included in the broadcast messages received by the twin manager 506 via the network 410 and can identify that AHU controller (e.g., the AHU controller 408) that broadcast the data 518 and/or 522.

A table manager 526 of the twin manager 506 can be configured to discard data of the group data table 514. Furthermore, the table manager 526 can be configured to discard data of the local data table 530. The table manager 526 can be configured to compare a timestamp of the data of the group data table 514 against a threshold. If the timestamp is a predefined amount less than the threshold, the table manager 526 can mark the data as unreliable and/or discard the data. The threshold may be a multiple of a broadcast rate for the data (e.g., a three second multiple). In this regard, the twin manager 506 may not rely on old or unreliable data when determining control commands for the AHU actuators 548.

The local data table 530 can be updated by the twin manager 506 based on data measured by the twin manager 506 for the AHU sensors 544, received from the network 410, or received via a dedicated user interface of the AHU controller 406. The data measured and stored in the local data table 530 by the twin manager 506 may be the data of the Table 2. The data may include various setpoint values. The setpoint values can be received via a user interface of the AHU controller 406, e.g., via a keypad, display screen, touch screen, keyboard, button, switch, dial, etc. Furthermore, the setpoint data can be received from a controller, server, or other computing device via the network 410.

Based on the local data table 530 and the group data table 514, a data table generator 528 of the twin manager 506 can be configured to generate a calculated data table 532. The calculated data table 532 can be averaged, extreme, or otherwise selected data of the group data table 514 and the local data table 530. The values of the calculated data table 532 can be used by the AHU controller 534 in determining control outputs. In some embodiments, the data table generator 528 may include a data structure indicating which operations to perform on particular data types. For example, the data structure may be, or may include the information of Table 3. As an example of the operation of the data table generator 528, if the group data table 514 includes three supply static pressure values for three difference AHU controllers and the local data table 530 includes a pressure supply static pressure value of the AHU controller 406, the data table generator 528 can be configured to generate an average supply static pressure value and store the generated average supply static pressure value in the calculated data table 532.

Table 3 below indicates shared values of the AHU controllers of the masterless AHU controller system 400. The Table 3 indicates the rate at which the values are broadcast by the network manager 508 and the operation that the data table generator 528 can be configured to perform on the data of the group data table 514 and/or the local data table 530. The network manager 508 can be configured to generate a single data package for objects that have the same update message rate. The objects marked with an asterisk may be "optional" objects. The optional values may be values that are not required for an AHU to function, i.e., they are additional values which can improve and increase the functionality of an AHU.

In Table 3, some of the objects have a write back flag enabled. Write back may refer to saving a value in temporary memory (e.g., a cache) and then saving the value in permanent memory (e.g., flash memory). Certain object, for example setpoints, may be written back to the source when a change is detected over the twinning network. For example, if a supply static pressure setpoint is changed on the AHU controller 406, the changed value can be shared via the network 410 and detected by AHU controller 408. AHU controller 408 may write its local supply static pressure setpoint (e.g., the value for the supply static pressure setpoint in the calculated data table 532) to this new value and then persist the new value in permanent memory (e.g., in the group data table 514). Objects with write back enabled may be setpoints that need to be shared and persisted across a power cycle regardless of the state of the system.

Each of the objects of Table 3 is shown to include an object identifier (OID) and an attribute for the present value of the object and the reliability of the object. Furthermore, some of the objects may be marked as "always share." Some of the objects of Table 3 may only be shared when an isolation damper of the AHU 402 is open. However, objects that are marked as "always share" may continue to be shared even if the isolation damper is closed.

The isolation damper may be a damper that is placed at the output of the AHU 402 to prevent backflow when the AHU 402 is off or disabled. When the isolation damper is closed, the AHU controller 406 can be configured to stop sharing some of its sensor values since some of those sensors are impacted by the state of this damper. For example, RAT, ZNT, and/or zone humidity may not be shared since these values would be affected by the state of the isolation damper. However, a setpoint may not be affected by the state of the isolation damper and thus the setpoint can continue to be shared. The "always share" flag of Table 3 can configure how values are shared for each sensor value and/or setpoint value. The AHU controller 406 can continue to share values with "always share" set to true even when the isolation damper is closed. Values with "always share" set to false may not be shared when the isolation damper is closed.

TABLE 3

AHU Data Objects, Broadcast Rates, and Object Operations

| Object | Broadcast Rate | Always Share | Writeback | Operation | Object Name | Present Value BACOid, attr | Reliability BACOid, attr |
|---|---|---|---|---|---|---|---|
| Supply Static Pressure | 2 Seconds | True | False | Average | DA_P | AI-9334, 85 | AI-9334, 103 |
| Supply Static Pressure Setpoint | COV | True | True | Latest | DAP_SP | AV-19, 85 | AV-19, 103 |
| Supply Fan Percent Command | 2 Seconds | False | False | Average | SF_O | AO-2780, 85 | AO-2780, 103 |

TABLE 3-continued

AHU Data Objects, Broadcast Rates, and Object Operations

| Object | Broadcast Rate | Always Share | Writeback | Operation | Object Name | Present Value BACOid, attr | Reliability BACOid, attr |
|---|---|---|---|---|---|---|---|
| Outdoor Air Temperature | 30 Seconds | True | False | Average | OA_T | AI-29102, 85 | AI-29102, 103 |
| Outdoor Air Humidity | 30 Seconds | True | False | Average | OA_H | AI-29113, 85 | AI-29113, 103 |
| Outdoor Air Quality* | 30 Seconds | True | False | Average | OAQ_dest | AV-300045, 85 | MV-300078, 85 |
| Return Air Temperature | 30 Seconds | False | False | Average | RA_T | AI-30593, 85 | AI-30593, 103 |
| Return Air Humidity | 30 Seconds | False | False | Average | RA_H | AI-25144, 85 | AI-25144, 103 |
| Return Air Quality* | 30 Seconds | False | False | Average | RAQ_dest | AV-300050, 85 | MV-300076, 85 |
| Occupancy Schedule | COV | True | False | Latest | OCC_SCHEDULE | MV-59, 85 | MV-59, 103 |
| Occupancy Sensor Enable | COV | True | True | Latest | OCC_SENSOR_EN | BV-25345, 85 | BV-25345, 103 |
| Occupancy BI EM | COV | True | False | Latest | OCC_BI_EM | MV-297872, 85 | MV-297872, 103 |
| Occupancy Sensor | COV | True | False | Latest | OCC_S | BI-29007, 85 | BI-29007, 103 |
| NetSensor Occupancy Request | COV | True | False | Latest | NSD Detect | NSDET-1, 3818 | NSDET-1, 50326 |
| Indoor Air Quality | 30 Seconds | True | False | Average | NSD Detect | NSDET-1, 795 | NSDET-1, 50325 |
| CO2 Setpoint | COV | True | True | Latest | ECON_IAQ_SP | AV-5995, 85 | AV-5995, 103 |
| Economizer Minimum Position Setpoint | COV | True | True | Latest | USER_DAMPER_MIN_POS | AV-5993, 85 | AV-5993, 103 |
| Outdoor Air Flow Setpoint | COV | True | True | Latest | OA_FLOW_SP | AV-5996, 85 | AV-5996, 103 |
| Building Static Pressure | 2 Seconds | True | False | Average | BLDG_P | AI-30603, 85 | AI-30603, 103 |
| Building Static Pressure Setpoint | COV | True | True | Latest | BSP_SP | AV-29127, 85 | AV-29127, 103 |
| Smoke Purge Status 1 | COV | True | False | Latest | PURGE_1_STATUSdest | BV-300047, 85 | BV-300047, 103 |
| Smoke Purge Status 2 | COV | True | False | Latest | PURGE_2_STATUSdest | BV-300048, 85 | BV-300048, 103 |
| Smoke Purge Status 3 | COV | True | False | Latest | PURGE_3_STATUSdest | BV-300049, 85 | BV-300049, 103 |
| Smoke Control Priority 1 | COV | True | True | Latest | SAFETY_SETUP_1 | MV-29106, 85 | MV-29106, 103 |
| Smoke Control Priority 2 | COV | True | True | Latest | SAFETY_SETUP_2 | MV-29107, 85 | MV-29107, 103 |
| Smoke Control Priority 3 | COV | True | True | Latest | SAFETY_SETUP_3 | MV-29108, 85 | MV-29108, 103 |
| Zone Temperature* | 30 Seconds | False | False | Average | AN_T_dest | AV-300055, 85 | MV-300074, 85 |
| Zone Temperature Sensor | 30 Seconds | True | False | Average | NSD Detect | NSDET-1, 941 | NSDET-1, 50324 |
| Zone Humidity* | 30 Seconds | False | False | Average | ZN_H_dest | AV-300056, 85 | MV-300075, 85 |
| Zone Humidity Sensor | 30 Seconds | True | False | Average | NSD Detect | NSDET-1, 63845 | NSDET-1, 3615 |
| Slab Temperature* | 30 Seconds | True | False | Average | SLAB_T_dest | AV-300092, 85 | MV-300093, 85 |

TABLE 3-continued

AHU Data Objects, Broadcast Rates, and Object Operations

| Object | Broadcast Rate | Always Share | Writeback | Operation | Object Name | Present Value BACOid, attr | Reliability BACOid, attr |
|---|---|---|---|---|---|---|---|
| Slab Humidity* | 30 Seconds | True | False | Average | SLAB_H_dest | AV-300090, 85 | MV-300091, 85 |

The twin manager 506 is shown to include an AHU controller 534. The AHU controller 534 can be configured to generate control decisions for the AHU actuators 548 based on the calculated data table 532. The AHU controller 534 can be configured to use any of a variety of control algorithms (e.g., state-based algorithms, extremum-seeking control algorithms, PID control algorithms, model predictive control algorithms, feedback control algorithms, etc.) to determine appropriate control actions for the AHU actuators 548. The AHU controller 534 can be configured to apply control algorithms to the data of the calculated data table 532. For example, the AHU controller 534 can be configured to perform a PID algorithm based on an average supply static pressure determined by the data table generator 528 to cause the static pressure of the supply duct 412 to meet the most recently received static pressure setpoint of the calculated data table 532. In some embodiments, the AHU controller 534 performs control algorithms at a predefined period. The period may be the same and/or greater than the broadcast rate for data used to perform the control algorithm. For example, for supply static pressure, which may be shared every two seconds, the AHU controller 534 can be configured to perform the static pressure PID algorithm every two seconds.

The twin manager 506 is further shown to include a fan controller 536. The fan controller 536 can be configured to control a supply fan (e.g., the AHU actuator 548). In some embodiments, the fan controller 536 can be configured to cause the AHU controller 406 to distribute the demand of the AHUs of the masterless AHU controller system 400 when the AHU controller 406 is added to the masterless AHU controller system 400. For example, for a system that may include three twinned AHUs with a fourth AHU on standby, when the fourth AHU is activated, the system is satisfied and the fourth AHU would determine that it does not need to take any actions because the system is satisfied. The AHU may operate its actuators at minimum requirements. The capacity of the system would not distribute evenly among all four units causing system inefficiency. In this regard, the fan controller 536 can operate to cause system capacity to be evenly distributed across all of the AHUs of the masterless AHU controller system.

The fan controller 536 can be configured to receive a supply fan command value from the calculated data table 532 and cause the AHU controller 534 to be disabled in response to the AHU controller 406 turning on. The fan controller 536 can be configured to control a supply fan by ramping the speed of fan up to the supply fan command value over a time period. The fan controller 536 can continuously or iteratively increment the speed of the fan until the supply fan command value is met. Once the supply fan command is met, the fan controller 536 can enable the AHU controller 534 causing the AHU controller 534 to engage control based on the values of the calculated data table 532. This more evenly distributes the capacity of AHUs of the masterless AHU controller system in response to the AHU controller 406 being added (e.g., turned on) to the masterless AHU controller system 400.

Figure 6A:
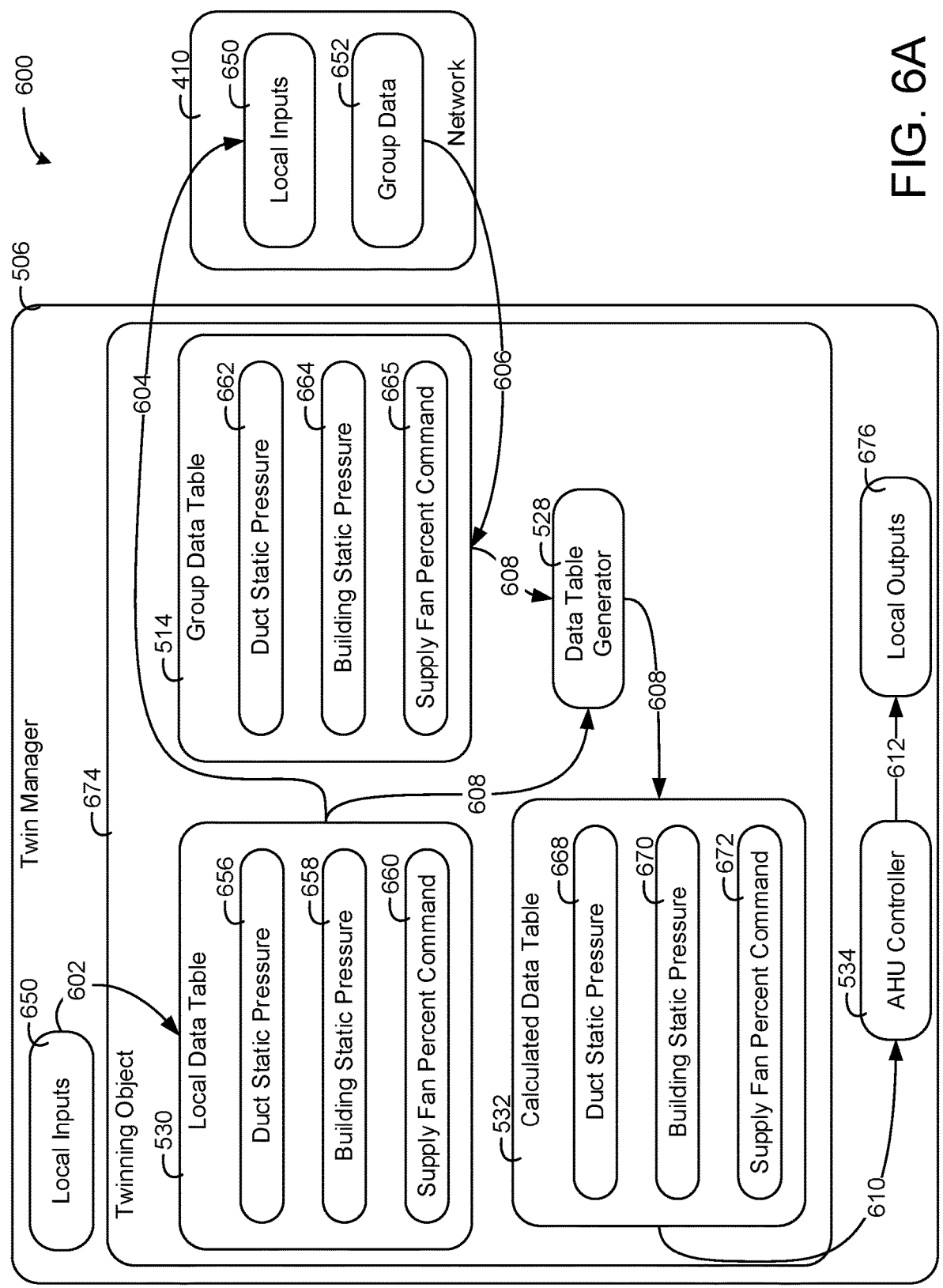
FIG. 6A is a flow diagram of a process for controlling an AHU with data from multiple AHU controllers, according to an exemplary embodiment.
Figure 6B:
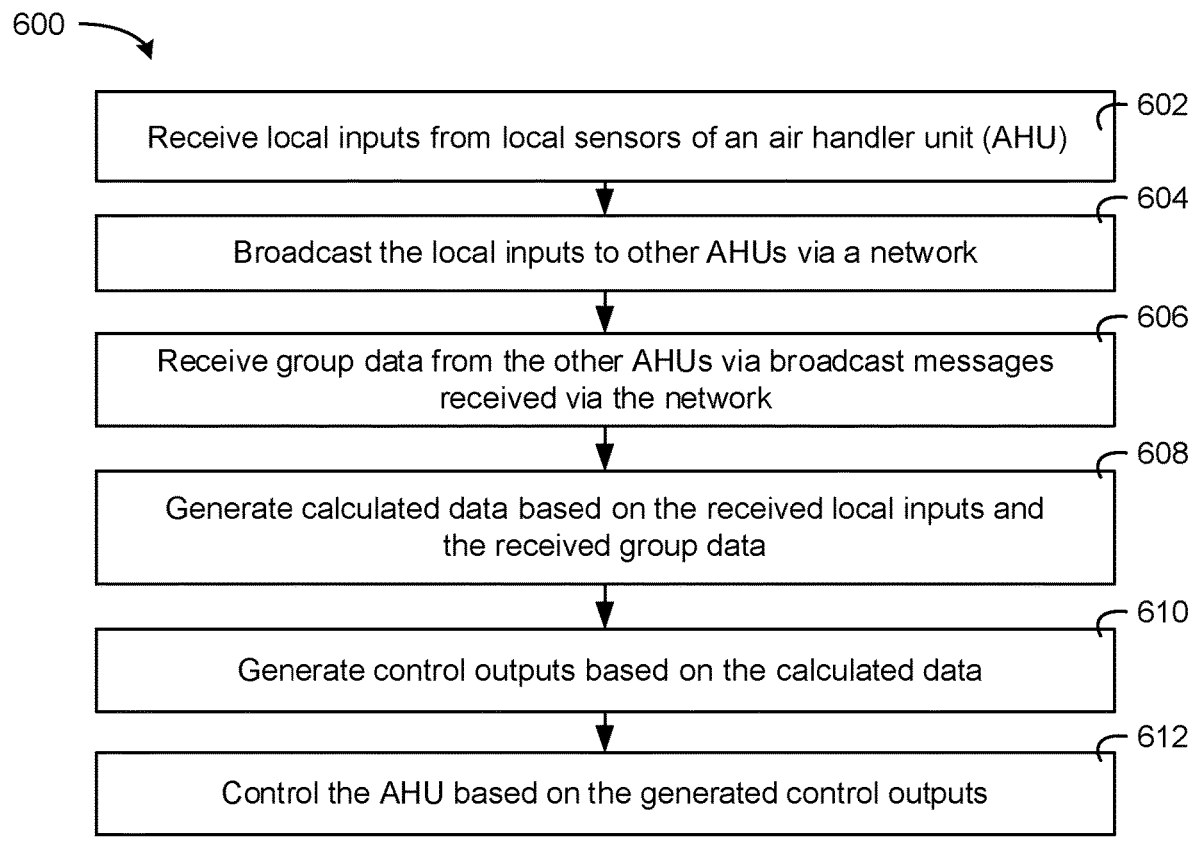
FIG. 6B is a flowchart illustrating the process of FIG. 6A in greater detail, according to an exemplary embodiment.

Referring now to FIGS. 6A and 6B, a process 600 for generating the calculated data table 532 for data of the masterless AHU controller system 400 and generating outputs based on the calculated data table 532 is shown, according to an exemplary embodiment. The AHU controller 406 can be configured to perform the process 600. More specifically, the twin manager 506 can be configured to perform the process 600. Any AHU of the masterless AHU controller system 400 can be configured to perform the process 600.

Referring more particularly to FIG. 6A, various modules and components are shown for performing the process 600 by the AHU controller 406. Furthermore, indications of steps of the process 600 are shown. The modules and/or the functionality of the modules can be implemented by the twin manager 506. The twin manager 506 can be configured to perform the process 600 with the specific modules shown in FIG. 6A or any other combination of modules. In FIG. 6A, a twinning object 674 is shown storing data, i.e., the local data table 530, the group data table 514, and the calculated data table 532.

Further, the twinning object includes various functionality, e.g., the data table generator 528. The twin manager 506 can implement the twinning object 674 and/or can implement the functionality of the twinning object 674. The twinning object 674 can be configured to operate as an interface between a control application of the AHU 402 (e.g., the AHU controller 534) and the network 410. The twinning object 674 can further be configured to gather local data from the local inputs 650, processes the local inputs 650, generate the calculated data table 532 with the data table generator 528, and make the local inputs 650 available via the network 410.

The local inputs 650 can be data gathered by the AHU sensors 544, control decisions determined by the AHU controller 543, and/or can be data received from a user or another controller, e.g., a setpoint. The local outputs 676 can be control decisions made by the AHU controller 534, e.g., a fan speed, an actuator position, etc. The local outputs 676 can be provided to the AHU actuators 548.

The local data table 530 is shown to include a duct static pressure 656, a building static pressure 658, and a supply fan percent command 660. The duct static pressure 656 and the building static pressure 658 can be data measured via the AHU sensors 544. The supply fan percent command 660 may be a particular amount to run a fan at for the AHU 402 determined by the AHU controller 534. The data shown in the local data table 530 is exemplary; the local data table 530 can include any other local data described herein.

Similarly, the group data table 514 is shown to include a duct static pressure 662, a building static pressure 664, and a supply fan percent command 665. The values may be received for another AHU controller of the masterless AHU controller system 400 via the network 410, e.g., the group data 652. The group data 652 may be data broadcast via the network 410 by various other AHU controllers, e.g., the AHU controller 408.

The calculated data table 532 is shown to include a duct static pressure 668, a building static pressure 670, and a supply fan percent command 672 determined by the data table generator 528 based on the local data table 530 and the group data table 514. The data table generator 528 can be configured to determine the duct static pressure 668 based on the duct static pressure 656 and the duct static pressure 662. The data table generator 528 can be configured to average the duct static pressure 656 and the duct static pressure 662 to generate the duct static pressure 668. The data table generator 528 can be configured to determine the building static pressure 670 based on the building static pressure 658 and the building static pressure 664 e.g., by averaging the building static pressure 658 and the building static pressure 664. Furthermore, the data table generator 528 can be configured to generate the supply fan percent command 672 by averaging the supply fan percent command 660 with the supply fan percent command 665.

In some embodiments, the twinning object 674 stores the values of the local data table 530 and the group data table 514 in a single data structure, a combined data table. The combined data table may be a two dimensional array of structures with one dimension being indexed based on device identifiers and the other dimension being indexed based on object identifiers (OIDs). The structures are exemplified in Table 4.

Combined Data Table [Device Identifier][*OID*] =

$$\begin{matrix} Structure_1 & Structure_2 & Structure_3 \\ Structure_4 & Structure_5 & Structure_6 \\ Structure_7 & Structure_8 & Structure_9 \end{matrix}$$

The object index may be defined by a particular order, the order being defined based on an attribute of the twinning object 674 e.g., a list attribute. The list attribute may have multiple versions, each version being associated with a different order. In this regard, the list attribute may be controlled by another attribute of the twinning object 674, a version attribute which defines which version of the list. The first item in the combined table may be the local values (e.g., the data of the local data table 530). The remaining items in the device index may be the data of the group data table 514 which may be controlled by the device ID shared in the broadcast message.

TABLE 4

Structure of Combined Data Table

| Member Name | Data Type | Description |
| --- | --- | --- |
| Object Identifier (OID) | Unsigned Long | Object identifier of a data member |
| Datatype | Float, Enumerated | Datatype of the value, may be a float or an enumerated datatype |
| Value | Union | Current value (present value) of the object |
| Reliability | Unsigned Short | Reliability of the object to be shared |

TABLE 4-continued

Structure of Combined Data Table

| Member Name | Data Type | Description |
| --- | --- | --- |
| updateRate (updateRateInMs) | Unsigned Short | The rate to share the value in seconds (The rate to share the value in milliseconds) |
| Operation | Enumerated | The operation to perform on the shared values |
| Timestamp | Unsigned Long | A timestamp in operating system ticks of the last time the value was received |

Referring more particularly to FIG. 6B, the process 600 is described in greater detail. FIG. 6B is described with reference to the twin manager 506, i.e., the twin manager 506 can be configured to perform the process 600, but can be performed by any computing device or component described herein. In step 602, the twin manager 506 can be configured to receive the local inputs 650 of the AHU 402. The local inputs 650 received by the twin manager 506 can include measured values, e.g., pressures, temperatures, etc. and can include control commands, e.g., setpoints, percent commands, etc. The local inputs 650 can be received via a sensor (e.g., the AHU sensors 544), via a keypad or entry device for a user, and/or from another controller (e.g., a thermostat, a user control device, etc.).

In step 604, the twin manager 506 can broadcast the local inputs 650 via the network 410. In some embodiments, the twin manager 506 can be configured to broadcast the values of the local data table 530 which may store the local inputs 650. In step 606, the twin manager 506 can receive group data 652 from the network 410 and store the group data 652 in the group data table 514. The group data 652 may be the data shown in the group data table 514 broadcast by one or multiple other AHU controllers via the network 410.

Based on the local data table 530 (e.g., the local inputs 650) and the group data table 514, the data table generator 528 of the twin manager 506 can be configured to generate the calculated data table 532 (step 608). The data table generator 528 can generate calculated data based individual data values of the two tables by performing averages, selecting a highest value, selecting a lowest value, or selecting a most recent value. Based on the calculated data, e.g., the calculated data table 532, the AHU controller 534 can generate local outputs 676. The AHU controller 534 can execute a control process which generates the local outputs 676 based on the calculated data of the calculated data table 532 (step 610). Based on the local outputs 676, the twin manager 506 can be configured to control the AHU actuators 548 to control environmental conditions (step 612) (e.g., air temperature, air pressure, air speed, etc.)

Figure 7A:
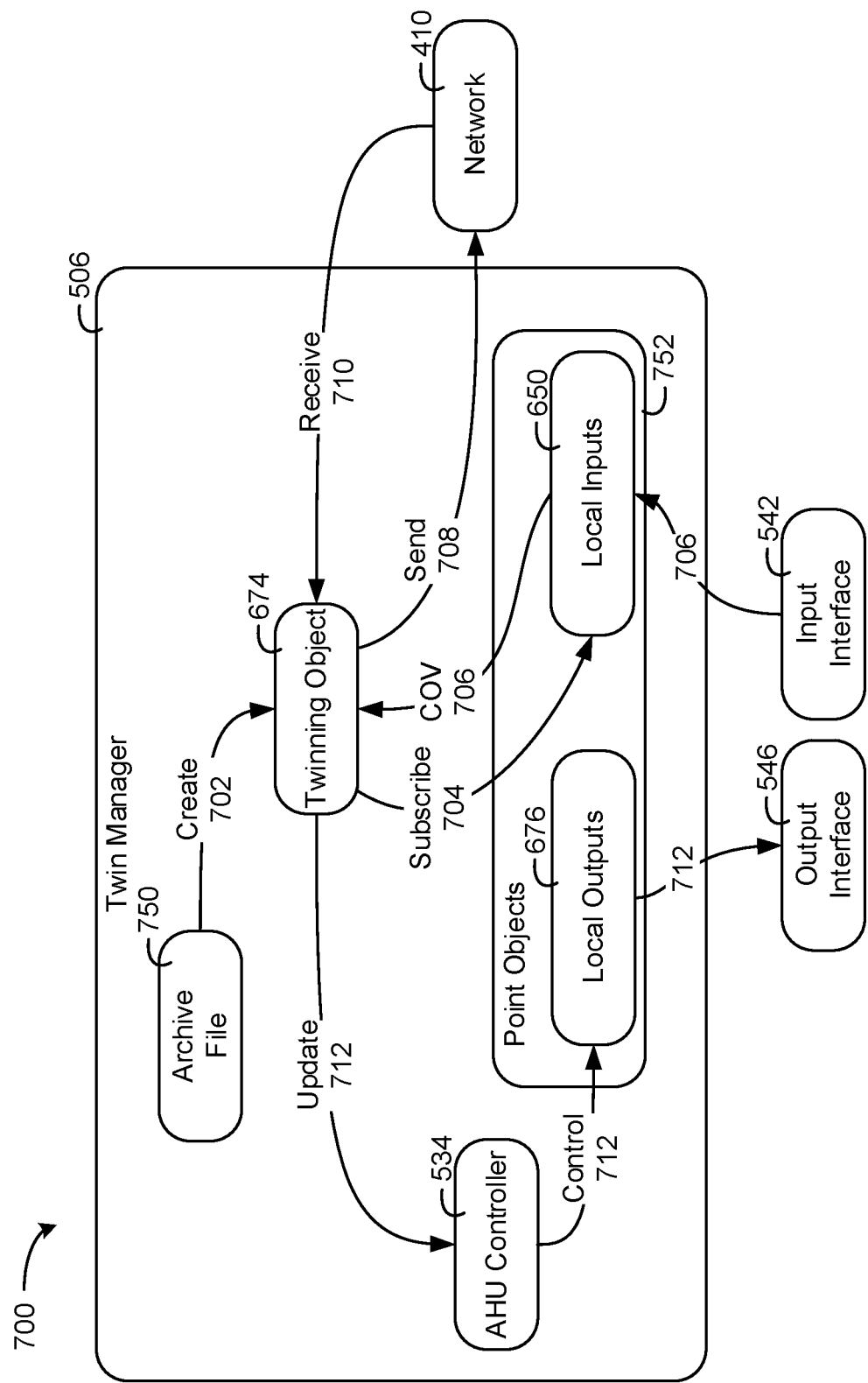
FIG. 7A is a flow diagram for generating and operating a twinning object for the AHU controller of FIG. 5, according to an exemplary embodiment.
Figure 7B:
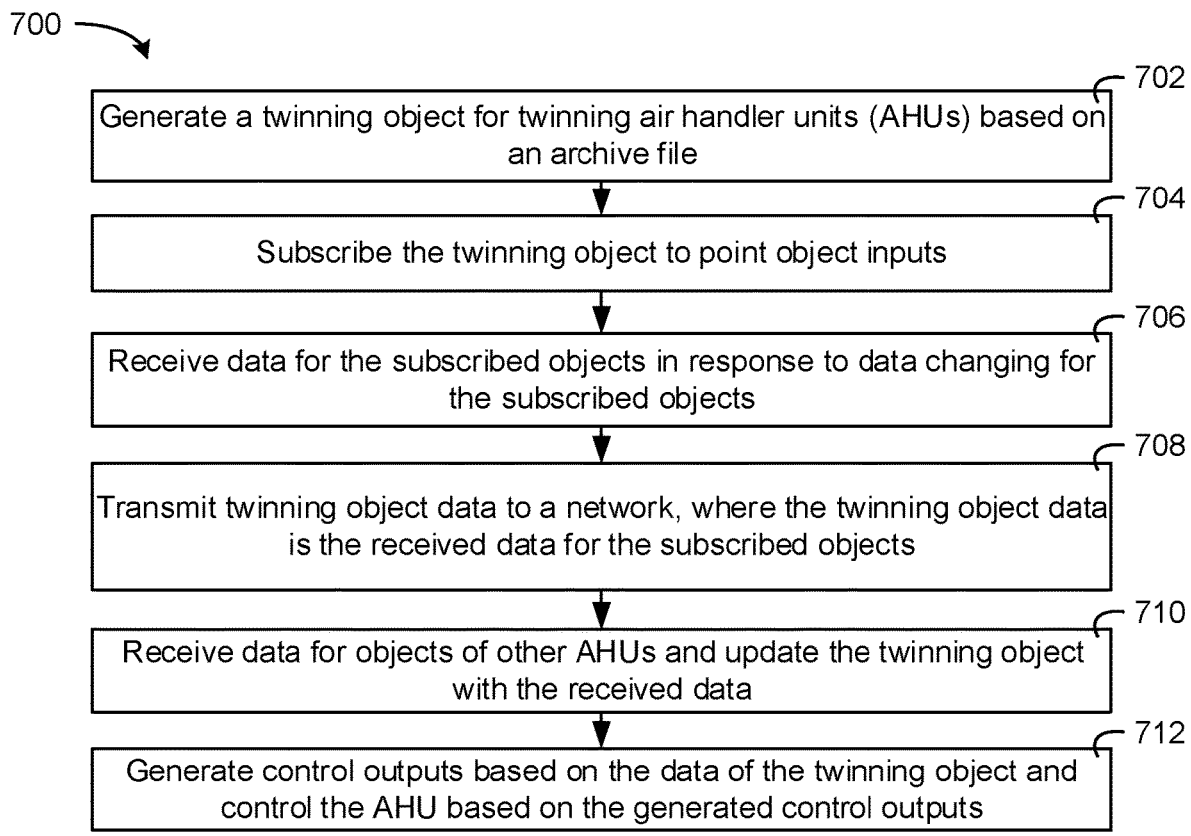
FIG. 7B is a flowchart illustrating the process of FIG. 7A in greater detail, according to an exemplary embodiment.

Referring now to FIGS. 7A and 7B, a process 700 for generating the twinning object 674 and using the twinning object 674 to facilitate the operation of the masterless AHU controller system 400, according to an exemplary embodiment. The AHU controller 406 can be configured to perform the process 700. More specifically, the twin manager 506 can be configured to perform the process 700. Any AHU of the masterless AHU controller system 400 can be configured to perform the process 700.

Referring more particularly to FIG. 7A, the twin manager 506 is shown to generate the twinning object 674 based on an archive file 750. The archive file 750 can be any kind of data file or data storage element configured to store various object definitions for the twinning object 674. The archive file 750 can be an Extensible Markup Language (XML) file that stores objects and object attributes, e.g., the XML file stores the twinning object 674 and attributes and/or methods for the twinning object 674.

The twin manager 506 is shown to include point objects 752. The point objects 752 can be data structures (e.g., data objects) which represent the various inputs and/or outputs of the AHU controller 406. The point objects 752 may be data objects that are updated via physical hardware (e.g., the input interface 542), e.g., physical sensors, input keypads, communications interfaces, etc. Furthermore, the point objects 752 may be data objects that are used to control physical outputs (e.g., the output interface 546), e.g., control actuators (e.g., fans, dampers, etc.). The point objects 752 are shown to include the local outputs 676 and the local inputs 650. The local outputs 676 can include various data points including analog outputs (AOs), binary outputs (BOs), analog virtual (AVs), binary virtual (BVs), and/or multi-state virtual (MVs). Similarly, the local inputs 650 can include various input data points including analog inputs (AIs), binary inputs (BIs), analog virtual (AVs), binary virtual (BVs), and/or multi-state virtual (MVs).

Referring more particularly to FIG. 7B, in step 702, the twin manager 506 can generate the twinning object 674 based on an archive file 750. The archive file 750 can be a file defining the twinning object 674, e.g., an XML type file. In step 704, the twin manager 506 can subscribe the twinning object to the local inputs 650. The local inputs 650 may be objects identified by particular object identifiers (OIDs). The subscription may cause the twinning object 674 to receive values for the local inputs 650 and/or reliabilities of the local inputs 650 at a COV and/or at a predefined rate. The OIDs which the twinning object 674 subscribes to may be statically defined by the archive file 750.

In step 706, the twinning object 674 receives the local inputs 650 in response to a COV for the local inputs 650. Based on the received values for the local inputs 650, the twin manager 506 can broadcast the values of the local inputs 650 to the network 410 for the other AHU controllers of the masterless AHU controller system 400 to receive (step 708). Furthermore, the twinning object 674, in step 710, can receive broadcast object values via the network 410, the broadcast being broadcast by other AHU controllers of the masterless AHU controller system 400.

Based on the values received in the steps 706 and 710, the twinning object 674 can generate calculated values and generate control decisions for the AHU controller 406 based on the calculated values and control the AHU 402 based on the control decision (step 712). For example, the twinning object 674 can generate calculated values based on local values and the received network values (e.g., the data of the local data table 530 and the group data table 514). Based on the calculated values, the AHU controller 534 can generate values of the local outputs 676, e.g., control values of a control algorithm. In some embodiments, the twinning object 674 includes multiple output attributes. These output attributes can be read into a control application module. The control application module can be a PID controller or any other control algorithm and can be a module generated by software e.g., MATHWORKS® MATLAB®.

Figure 8A:
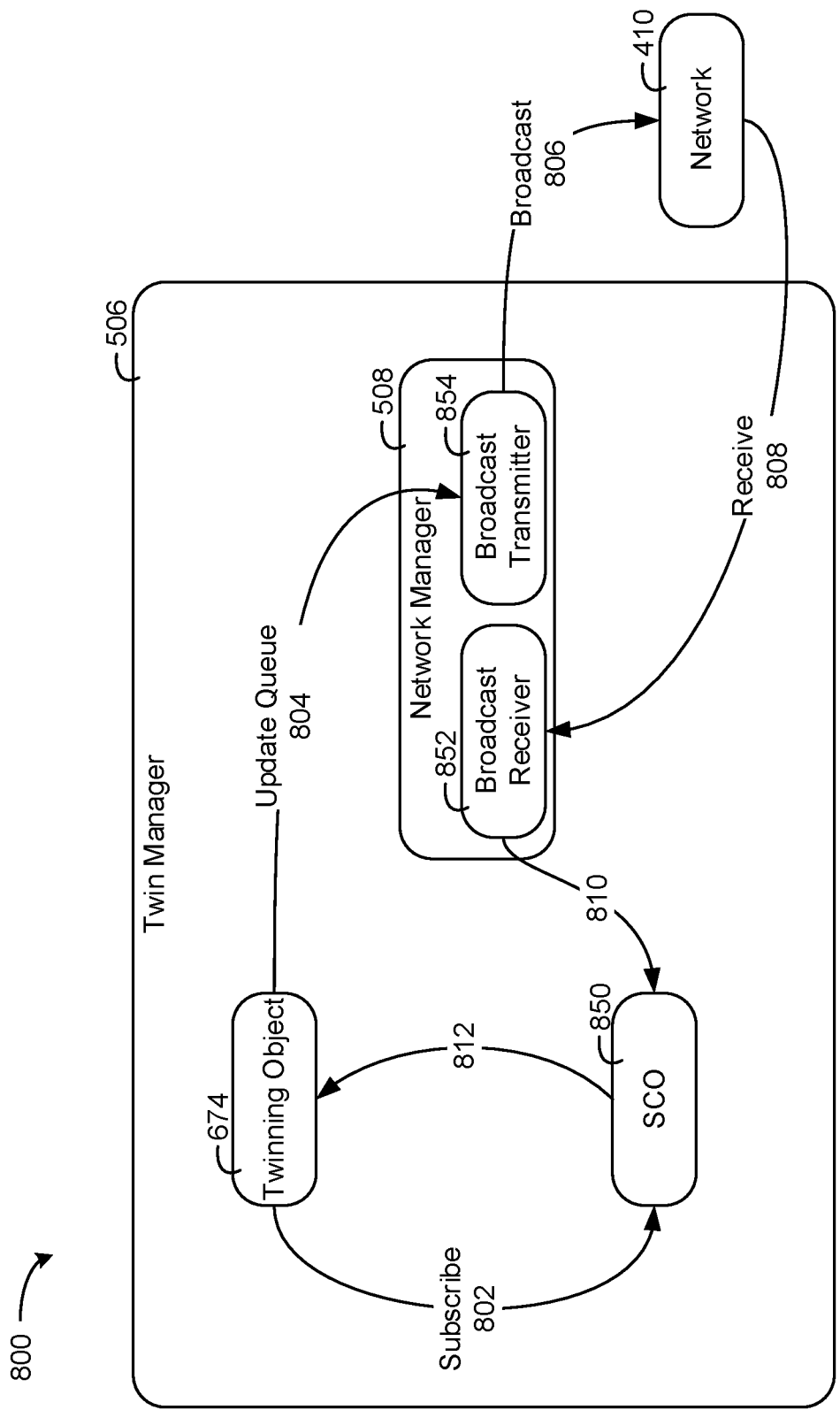
FIG. 8A is a flow diagram of a process for communicating with other AHU controllers via the twinning object of FIG. 7A, according to an exemplary embodiment.
Figure 8B:
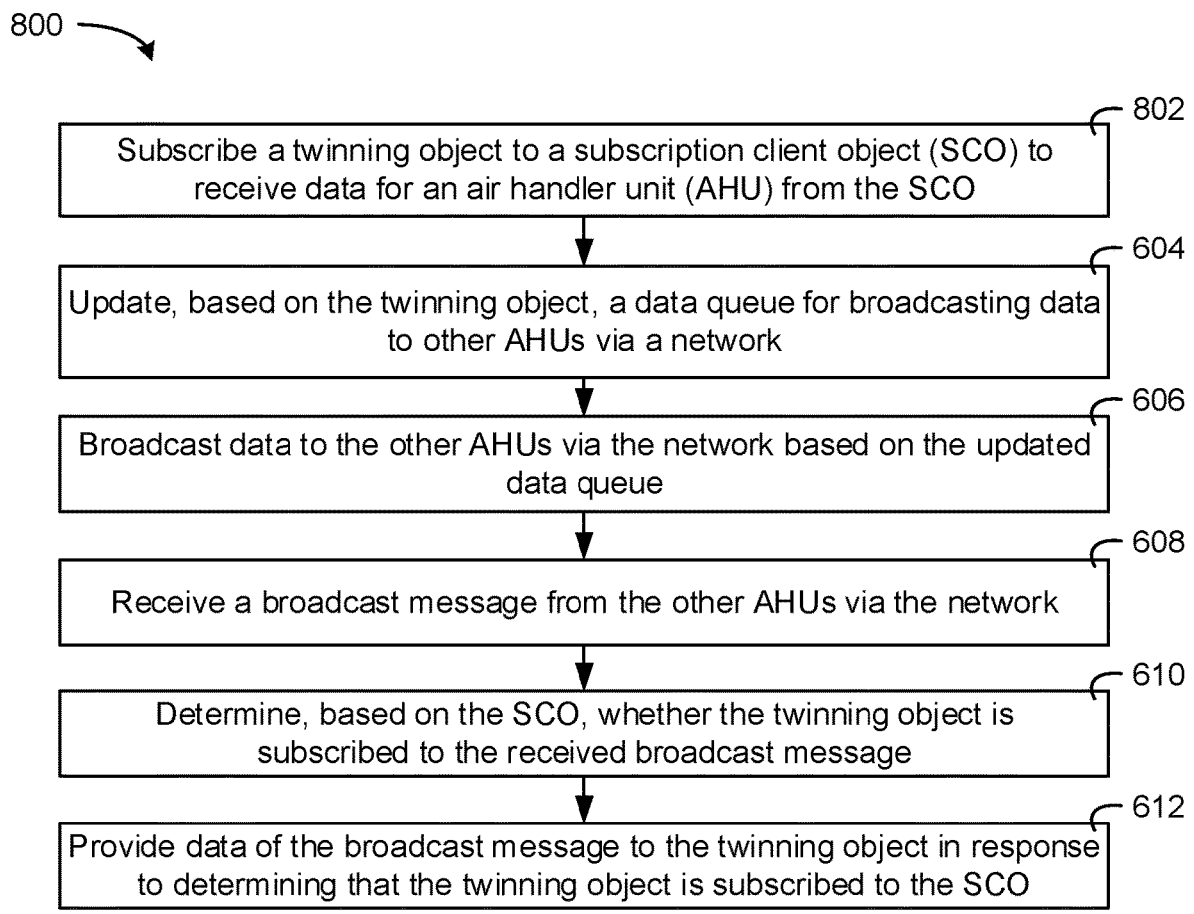
FIG. 8B is a flowchart illustrating the process of FIG. 8A in greater detail, according to an exemplary embodiment.

Referring now to FIGS. 8A and 8B, a process 800 is shown for broadcasting messages to the network 410 and receiving messages broadcast over the network 410, according to an exemplary embodiment. The AHU controller 406 can be configured to perform the process 800. More specifically, the twin manager 506 can be configured to perform the process 800. Any AHU of the masterless AHU controller system 400 can be configured to perform the process 800.

Referring more particularly to FIG. 8A, the twin manager 506 is shown to include the network manager 508 and a Subscription Client Object (SCO) 850. The network manager 508 can be configured to broadcast data to the network 410 and receive broadcasts from the network 410. The network manager is shown to include a broadcast transmitter 854. The broadcast transmitter 854 can be configured to broadcast data stored by the twinning object 674, e.g., local inputs 650.

In some embodiments, the broadcast transmitter 854 broadcasts MSTP messages, e.g., unconfirmed COV notifications. Broadcasting messages over a standard network e.g., BACnet MSTP allows for standard source debugging tools to be used in troubleshooting the network 410. Unconfirmed COV notifications can include less overhead than confirmed messages. In some embodiments, the masterless AHU controller system 400 uses 25% of the available MSTP bandwidth of the network 410. It may be good practice to limit the number of MSTP COV notifications broadcast via the network 410 to 500 COV messages per minute. Since each of the controllers of the masterless AHU controller system 400 can be configured to broadcast a message every two seconds, for one controller, 30 COV messages per minute may be broadcast which corresponds to 6% of the total bandwidth. Four controllers can generate 120 broadcasts per minute or 24% of the total bandwidth.

The broadcast transmitter 854 can be configured to check a message queue for high priority messages to transmit in response to the twin manager 506 receiving a token of the network 410 when the network 410 is a token network. In this regard, the broadcast transmitter 854 can include a message queue which includes messages for the masterless AHU controller system 400 which can be marked with a high and/or low priority level. The messages for the masterless AHU controller system 400 may include data for each individual controller (e.g., local input data) and can be marked with a high priority. The broadcast transmitter 854 can be configured scan the message queue in response to receiving the token and send all of the high priority messages first before sending other messages that do not pertain to the masterless AHU controller system 400.

Limits may be imposed on the number of values that can be shared so that multiple messages can fit in a single broadcast message (e.g., a single BACnet MSTP packet). Avoiding segmented requests keeps changes to a communications datalink of the network manager 508 as minimal as possible. Table 5 below indicates an exemplary unconfirmed COV notification that the broadcast transmitter 854 can broadcast via the network 410 where n is the number of attributes in the message.

TABLE 5

| Bytes | BACnet Application Protocol Data Unit (APDU) Field | Notes |
|---|---|---|
| 2 | Service Choice | — |
| 3 | Process Identifier (ID) (Tag 0) | Assuming a two byte process identifier (ID) |
| 5 | Initiating Device ID (Tag 1) | — |
| 5 | Monitored Object ID (Tag 2) | — |
| 2 | Time Remaining (Tag 3) | Will always be zero |
| 2 | List of Values (Tag 4) | — |
| 3n | Property ID (Tag 0) | — |
| 2n | Value Tag (Tag 2) | — |

TABLE 5-continued

Message size

| Bytes | BACnet Application Protocol Data Unit (APDU) Field | Notes |
|---|---|---|
| 5n | Property Value | Assuming five bytes for the largest datatype, i.e., float datatype |
| 19 + 10n | Total APDU Size | — |

The maximum APDU size for MSTP may be 480 bytes. The total number of attributes that can be included in a single BACnet MSTP message can be described below based on the Total APDU message size, Message Size=480=19+10n, n=46

Since every message with includes an indication of the group ID and device ID, the total number of available attributes can be reduced from 46 to 44. In this regard, 44 different values (e.g., pressure measurements, setpoints, control commands, etc.) can be broadcast in a single message.

The SCO 850 can be configured to handle the message broadcasts received via the network 410. In some embodiments, the SCO 850 is generated or configured based on a required objects table of the AHU. The required objects table may indicate which objects (e.g., setpoint, sensor values, etc.) are necessary for operating the AHU 402 and thus twinning object 674 can subscribe to the required objects via the SCO 850. In this regard, the twinning object 674 can receive values for any object which the AHU requires for operation. The SCO 850 can be configured to forwards messages (e.g., unconfirmed COV notifications) received via the network 410 to clients (e.g., the twinning object 674) that register with it. The SCO 850 can store an indication that the twinning object 674 is subscribed to a set of objects or a particular object, e.g., an Object A. When the broadcast receiver 852 receives a message for the Object A, the SCO 850 can determine that the subscription of the twinning object 674 matches an identifier of the received message and can forward the object and/or the message including the object to the twinning object 674.

The twinning object 674 can subscribe to the SCO 850 by calling a function, "apssubscribecov" that provides the SCO 850 with an OID, an attribute number, a subscription time, and/or a COV increment. The SCO 850 can perform a function "PROCESS_DIRECT_COV" when a notification is received via the broadcast receiver 852, the function can compare the received message to the subscription of the twinning object 674 and provide the twinning object 674 with the received message, or the value of the object of the message, to the twinning object 674.

Referring more particularly to FIG. 8B, the process 800 is shown in greater detail, according to an exemplary embodiment. In step 802, the twin manager 506 can subscribe the twinning object 674 to the SCO 850. Subscribing the twinning object 674 to the SCO 850 can cause the SCO 850 to send objects and/or object values to the twinning object 674 when messages for the subscribed objects are received from the network 410. The twin manager 506 can subscribe particular attributes of the twinning object 674 to specific objects. The specific objects may be required objects whose inputs are used to generate outputs for an AHU.

In step 804, the twinning object 674 can provide messages to a message queue of the broadcast transmitter 854. The data may be local data received from various sensors of the AHU. The broadcast transmitter 854 can add the values to a high priority queue or add an indication that the data of the twinning object 674 to be broadcast via the network 410. When the broadcast transmitter 854 receives a network token, an indication that it is the currently the turn of the broadcast transmitter 854 to broadcast data on the network 410, the broadcast transmitter 854 can broadcast the high priority data of the message queue on the network 410 before broadcasting any other data (step 806).

In step 808, the broadcast receiver 852 can receive broadcast messages of other controllers of the masterless AHU controller system 400 via the network 410. The received messages can be provided to the SCO 850. The SCO 850 can determine which objects the received message relates to. The SCO 850 can determine, based on stored subscriptions (e.g., the subscription of step 802), whether the object of the received message is subscribed to by the twinning object 674 (step 810). In step 812, the SCO 850 can provide the subscribed data received by the broadcast receiver 852 to the twinning object 674.

Figure 9A:
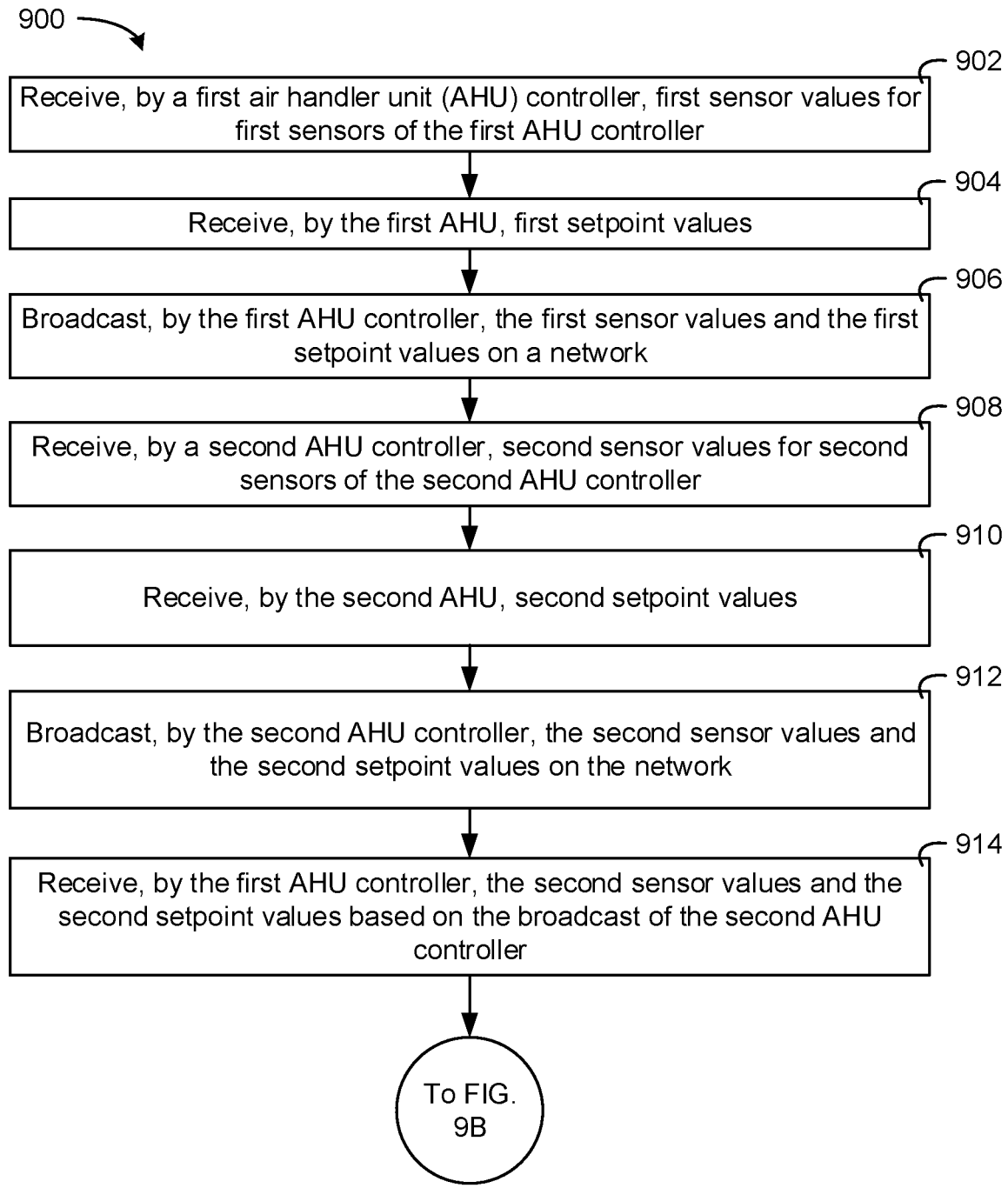
FIG. 9A is a flow diagram of a process for operating multiple AHUs by multiple AHU controllers without a master AHU controller that can be performed by the AHU controllers of FIG. 4, according to an exemplary embodiment.
Figure 9B:
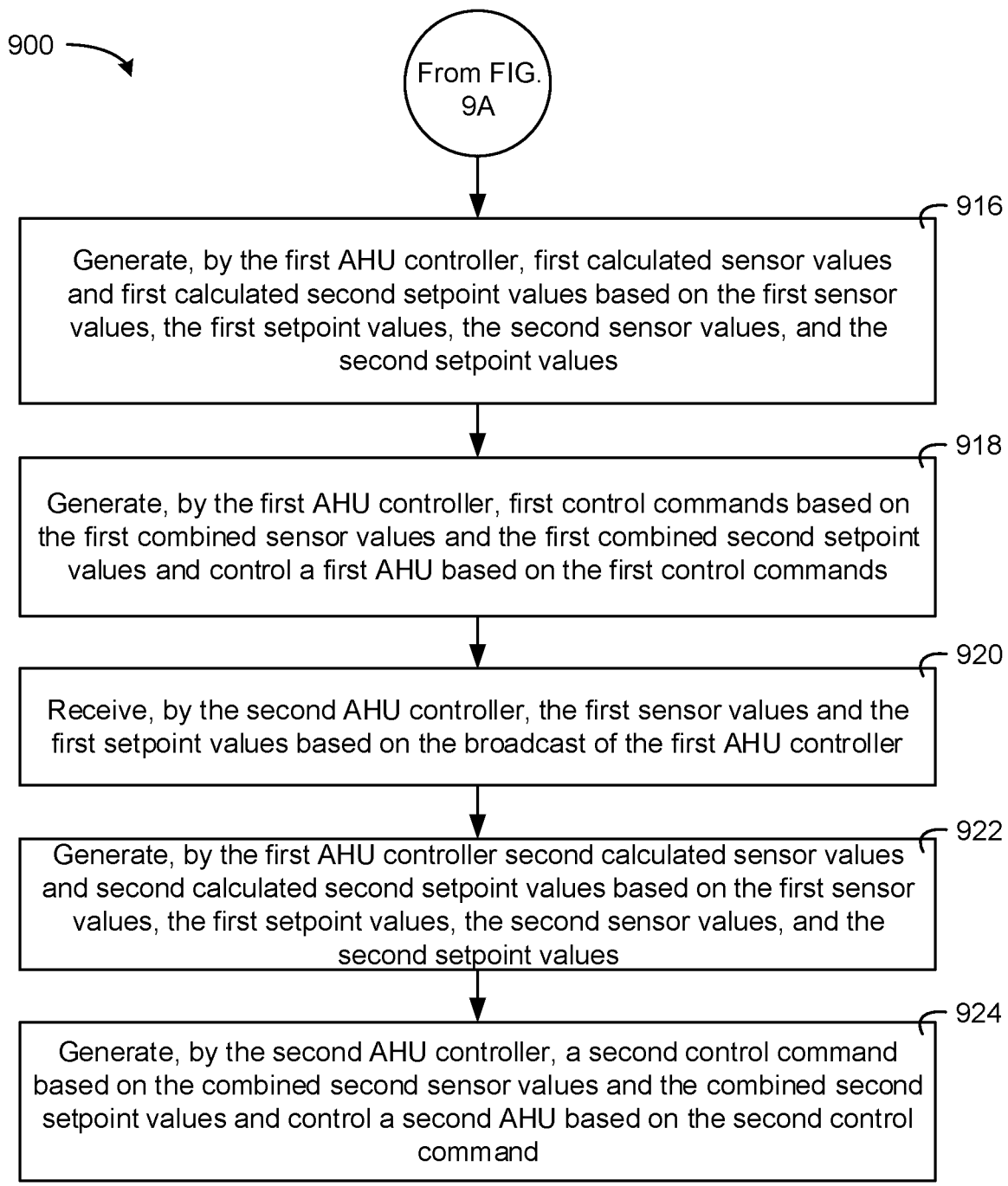
FIG. 9B is a flow diagram continuing the process of FIG. 9A, according to an exemplary embodiment.

Referring now to FIGS. 9A-9B, a process 900 is shown for operating the controllers of the masterless AHU controller system 400, according to an exemplary embodiment. The AHU controllers 406 and 408 can be configured to perform the process 900. More specifically, the twin manager 506 can be configured to perform the process 900. Any AHU of the masterless AHU controller system 400 can be configured to perform the process 900.

In step 902, the AHU controller 406 can receive first sensor values for first sensors of the AHU controller 406. The AHU controller 406 can receive input from the AHU sensors 544. Furthermore, in step 904, the AHU controller 406 can receive setpoints. The setpoints can be received via the network 410, via a keypad, a user interface, and/or from another control device (e.g., a thermostat or controller).

In step 906, based on the received first sensor values and the first setpoint values received in the steps 904 and 906, the AHU controller 406 can broadcast the first sensor values and the first setpoint values on the network 410. The AHU controller 406 can broadcast the data so that multiple AHU controllers of the masterless AHU controller system 400 can simultaneously each receive the broadcast data. This may require less bandwidth than individually communicating a message to each of the AHU controllers.

Furthermore, the messages may be unconfirmed broadcasts which do not require a response from the receiving controller. The AHU controller 406 can maintain a queue of messages to be broadcast and can mark the messages including the first setpoint value and the first sensor values as high priority. When it is the turn of the AHU controller 406 to broadcast on the network 410 (e.g., when a token is received), the AHU controller 406 can broadcast the high priority messages first, i.e., the first setpoint values and the first sensor values. Furthermore, each of the first setpoint values and the first sensor values may be associated with a particular broadcast rate. The broadcast rate may be associated with an iterative control process which executes at a period. The broadcast rate may be the same as and/or less than the control process execution period.

In steps 908-912, a second AHU controller, the AHU controller 408, can receive second sensor values for second sensors of the AHU controller 408, receive second setpoint values, and broadcast the received second sensor values and the received second setpoints on the network 410. The steps 908-912 may be similar to the steps 902-906 but instead performed by the AHU controller 408.

In step 914, the AHU controller 406 can receive the second sensor values and the second setpoint values broadcast by the AHU controller 408 in the step 912. In step 916, the first AHU controller can generate first calculated sensor values and first calculated setpoint values based on the first sensor values, the first setpoint values, the second sensor values, and the second setpoint values. The AHU controller 406 can generate the first calculated sensor values by performing various operations based on the first sensor values and the second sensor values. In some embodiments, the AHU controller 406 averages the first sensor values and the second sensor values to generate the first calculated sensor values. Based on the first setpoint values and the second setpoint values, the AHU controller 406 can generate the first calculated setpoint values.

In some embodiments, the AHU controller 406 generates the first calculated setpoint values by selecting the most recent values of the first setpoint values and the second setpoint values. For example, each of the setpoints of the first setpoint values and the second setpoint values may be associated with a time stamp. Based on the time stamp, the AHU controller 406 can compare the timestamps against each other and select a most recent setpoint as the first calculated setpoint values.

In step 918, the AHU controller 406 can generate first control commands based on the first calculated sensor values and the first calculated setpoint values. In some embodiments, the AHU controller 406 performs an iterative control algorithm e.g., a PID loop. The input into the control algorithm may be the first calculated sensor values and the first calculated setpoint values. The outputs of the control process can be provided to the AHU actuators 548. This may cause the AHU actuators 548 to control environmental conditions of the building 10.

In steps 920-924 the AHU controller 408 can receive the first sensor values and the first setpoint values broadcast by the AHU controller 406, generate calculated second sensor values and calculated second setpoint values based on the first sensor values, the first setpoint values, the second sensor values, and the second setpoint values, generate control commands based on the calculated second sensor values and the calculated second setpoint values, and control the AHU 404 based on the control commands. The steps 920-924 may be similar to the steps 914-920 but instead performed by the AHU controller 408.

Figure 10:
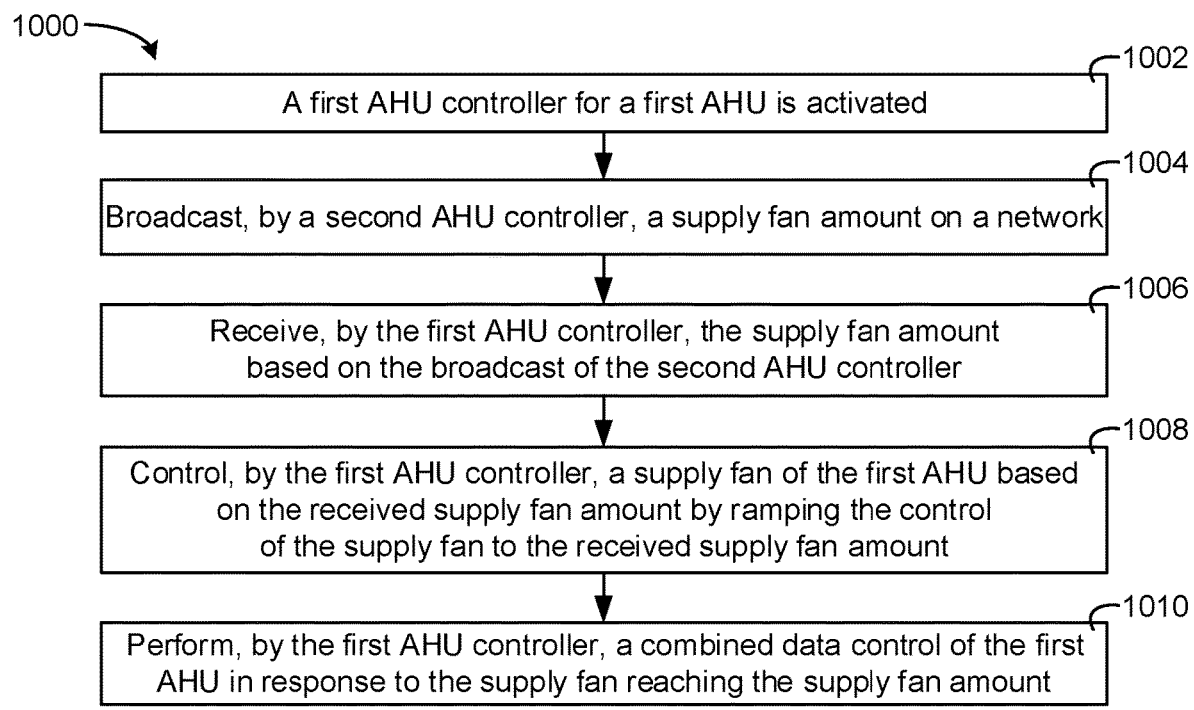
FIG. 10 is a flow diagram of a process for integrating one AHU into a multiple AHU system by ramping up the speed of a supply fan of the AHU before performing the control process of FIGS. 9A and 9B, according to an exemplary embodiment.

Referring now to FIG. 10, a process 1000 is shown for controlling a supply fan of the AHU 402 by the AHU controller 406 in response to the AHU controller 406 being activated, according to an exemplary embodiment. The AHU controllers 406 and 408 can be configured to perform the process 1000. More specifically, the twin manager 506 can be configured to perform the process 1000. Any AHU of the masterless AHU controller system 400 can be configured to perform the process 1000.

In step 1002, the AHU controller 406 is activated. In some embodiments, the AHU controller 406 is powered on from an off state. In some embodiments, activating the AHU controller 406 includes connecting the AHU controller 406 to a network, enabling the AHU controller 406 to begin controlling actuators of an AHU, etc. In step 1004, the AHU controller 408 can broadcast a supply fan amount on the network 410. The AHU controller 408 can perform a control processes (e.g., the process 900) and determine a command for a supply fan. The command may be a speed, a percentage, etc.

In step 1006, the AHU controller 406 can receive the broad cast supply fan amount broadcast in the step 1004. Rather than performing a masterless control of the AHU 402 by the AHU controller 406, in step 1008, the AHU controller 406 can cause a supply fan to ramp up in speed until the supply fan amount is met. The AHU controller 406 can continuously ramp up the speed of the AHU at a predefined amount, ramp up the speed of the fan by predefined iterations, and/or any other ramping. Once the supply fan reaches the supply fan amount (e.g., is operating at a predefined speed), the AHU controller 406 can begin controlling the AHU 402 based on the masterless control described with reference to FIGS. 9A and 9B (step 1010).

In some embodiments, the AHU controller 406 can receive multiple supply fan amounts from multiple AHU controllers. When multiple supply fan amounts are received, the AHU controller 406 can generate a calculated supply fan amount and use the calculated supply fan amount to control the supply fan. In some embodiments, generating the calculated supply fan amount includes performing an average of all the received supply amounts.

Twinning Object Attributes

Referring again to FIGS. 6A-8B, the functionality and structure of the twinning object 674 is described in greater detail. The twinning object 674 may be an object for an object-oriented programming language (e.g., Java, C++, C#, Python, MATLAB, etc.). The twinning object 674 may include data entries, attributes, and functional code, methods. Exemplary attributes of the twinning object 674 are shown in Table 6.

TABLE 6

Twinning Object Attributes

| Attribute Name | Data Type | In Out Cfg | Flags | Initial Value | Other Info Minimum or Maximum Values, Change Of Value (COV), Units, Maximum Length, Enumerations |
|---|---|---|---|---|---|
| VERSION_ATTR | Unsigned Short | Cfg | C, A | 0 | none |
| INPUT_LIST_ATTR | List of Structs | Cfg | C, A | None | none |
| POLL_TIME_1_ATTR | Unsigned Short | Cfg | C, A | 2 Seconds | Minimum = 2 Seconds |
| POLL_TIME_2_ATTR | Unsigned Short | Cfg | C, A | 30 Seconds | Minimum = 2 Seconds |
| GROUP_ID_ATTR | Byte | Cfg | W, C, A | 0 | none |
| DEVICE_NUMBER_ATTR | Byte | Cfg | W, C, A | 0 | none |

TABLE 6-continued

Twinning Object Attributes

| Attribute Name | Data Type | In Out Cfg | Flags | Initial Value | Other Info Minimum or Maximum Values, Change Of Value (COV), Units, Maximum Length, Enumerations |
|---|---|---|---|---|---|
| OFFLINE_ATTR | Boolean | Out | none | False | none |
| ONLINE_DEVICE_COUNT_ATTR | Byte | Out | none | 0 | none |
| INPUT_1_ATTR-INPUT_23_ATTR | Numeric | In | none | 0 | none |
| GIO_1_ATTR-GIO_23_ATTR (GIO_1_ATTR-GIO_32_ATTR) | Enumerated | In | none | 0 | none |
| OUTPUT_1_ATTR-OUTPUT_23_ATTR (OUTPUT_1_ATTR-OUTPUT_32_ATTR) | Numeric | Out | none | 0 | none |
| GIO_101_ATTR-GIO_123_ATTR (GIO_101_ATTR-GIO_132_ATTR) | Enumerated | Out | none | 0 | none |
| SYSTEM_ENABLED_ATTR | Boolean | In | W, C, A | False | none |

The flags of each of the attributes of the twinning object 674 can be writeable (W), priority on write (Z), execute on write (E), default attribute (D), internal attribute (I), value not required (N), configurable (C), archive (A), key attribute (K), input from another object (P), redirect default (V), redirect reliable attribute (R), person-machine interface (PMI) refresh (F), BACnet required (Q), and BACnet optional (O).

VERSION_ATTR

The "VERSION_ATTR" can be an attribute used to specify the order of input and output objects of the twinning object 674. This attribute can be changed if input (e.g., local inputs 650) or output objects (e.g., local outputs 676) are added or the order of the objects is modified. The attribute can be set based on the archive file 750 and can be shared over the network 410 with broadcast messages. The attribute can be used to determine how the outputs of the twinning object 674 are organized. For example, the AHU controller 406 may need to know which attributes of the twinning object 674 are used to perform a particular control algorithm. The AHU controller 534 can identify the attributes it requires based on the VERSION_ATTR attribute.

INPUT_LIST_ATTR

The "INPUT_LIST_ATTR" attribute can indicate a set of objects to be shared over the network 410 (e.g., the local inputs 650). The values to be shared over the network 410 may include members such as the members shown in Table 7A or 7B.

TABLE 7A

INPUT_LIST_ATTR Fields

| Member Name | Data Type | Description |
|---|---|---|
| Object Identifier (OID) | Unsigned Long | Object identifier of an object to be shared. The object to be shared is typically an analog virtual (AV), binary virtual (BV), or a multi-state virtual (MV) object |
| valueAttribute | Unsigned Short | Attribute identifier of the object value to be shared. The object to be shared can be a present value |
| reliabilityAttribute | Unsigned Short | Attribute identifier of the object reliability to be shared |
| updateRate | Enumerated | The rate to share values at |
| Operation | Enumerated | An operation to perform on shared values |

TABLE 7B

INPUT_LIST_ATTR Fields

| Member Name | Data Type | Description |
|---|---|---|
| pvOid | BAC_OID32 | Object identifier of the present value object to be shared (typically AV, BV, or MV) |
| relOid | BAC_OID32 | Object identifier of the object containing the reliability associated with the present value of the point |
| pvAttrNum | UShort | Attribute number of the present value attribute |
| relAttrNum | UShort | Attribute number of the reliability attribute |
| updateRate | Enum | The rate to share values |
| alwaysShare | Boolean | A flag to always share the value on the network even when system enabled attribute is false (e.g., even when an isolation damper is closed) |
| writeback | Boolean | A flag to write the local source object when the value on the network changes |
| Operation | Enum | The operation to perform on the shared values |

There may be a limit of 46 entries (e.g., device ID, group ID, setpoints, sensor values, etc.) in a message to be broadcast via the network 410. This limit may be set per poll rate in order to avoid segmentation when packaging the message. The limit of 46 entries is discussed with further detail with regards to Table 5 and FIG. 8A. The "updateRate" member can use a "POLL_RATE_ENUM_SET" parameter to set a polling rate to one of three values. The first may be a "POLL_RATE_FAST" setting which causes the update rate to be an update rate specified by a "POLL_TIME_1_ATTR" setting. The second setting may be a "POLL_TIME_1_ATTR" setting defined by a value for a "POLL_RATE_MEDIUM" setting. The third setting may be a "POLL_RATE_SLOW" setting which indicates that the value should be shared when there is a change of value (COV).

The "operation" member can use a "SIGNAL_SELECT_ENUM_SET" attribute. The SIGNAL_SELECT_ENUM_SET attribute can be set to a "SIGNAL_SELECT_AVERAGE" setting which indicates that the value should be used in an average calculation to generate an average value to the output of the twinning object 674, e.g., provided to the AHU controller 534 to be used in control.

The SIGNAL_SELECT_ENUM_SET can also be set to a "SIGNAL_SELECT_SINGLE_SENSOR" setting where the last value to be shared (the most recent value) can be fed to the output of the twinning object 674 and provided to the AHU controller 534. Furthermore, the SIGNAL_SELECT_ENUM_SET attribute can be set to a "SIGNAL_SELECT_HIGH_SIGNAL" option where a maximum of the shared values can fed to the output of the twinning object 674. Furthermore, the SIGNAL_SELECT_ENUM_SET attribute can be set to a "SIGNAL_SELECT_LOW_SIGNAL setting where a minimum of the shared values is fed to the output of the twinning object 674.

POLL_TIME_1_ATTR and POLL_Time_2_ATTR

The "POLL_TIME_1_ATTR" attribute can specify a broadcast rate for the POLL_RATE_FAST setting of the updateRate member. Furthermore, the "POLL_TIME_2_ATTR" attribute can specify the rate to broadcast values specified for the POLL_RATE_MEDIUM setting of the updateRate member.

GROUP_ID_ATTR

The "GROUP_ID_ATTR" attribute can specify a twinning group the unit belongs to. All AHUs that are twinned to a common supply duct can be configured with the same GROUP_ID_ATTR attribute. This attribute can be exposed to the user through an equipment model to allow it to be configured via a local interface (display, touch screen, keypad, etc.) or through a gateway (e.g., a MAP gateway). The default value for the attribute may be zero, indicating that the AHU is not twinned. When the GROUP_ID_ATTR attribute is zero, an offline status attribute can be set to false and the twinning object 674 may not perform any operation on shared values.

DEVICE_NUMBER_ATTR

The "DEVICE_NUMBER_ATTR" attribute can specify a unique device identifier that the AHU 402 can use to identify itself in broadcast messages. This attribute can be exposed to a user through an equipment model to allow it to be configured with a local interface or gateway. The DEVICE_NUMBER_ATTR attribute can be set to a default device address (e.g., an MAC address) so that user configuration is not required.

OFFLINE_ATTR

The "OFFLINE_ATTR" attribute can indicate whether an AHU is twinned. The attribute may indicate that the unit is twinned in response to the GROUP_ID_ATTR attribute being greater than zero. The OFFLINE_ATTR can be set to offline status if all other units in the group are offline. An alarm can be generated to notify a user that an AHU is unable to communicate with its peers and it is operating with its own sensors if the other units of the group are offline.

ONLINE_DEVICE_COUNT_ATTR

The "ONLINE_DEVICE_COUNT_ATTR" attribute may be a diagnostic attribute that indicates how many units are online in the group (including the unit itself). This attribute is zero if the unit is not twinned e.g., when the GROUP_ID_ATTR is zero.

INPUT_1_ATTR-INPUT_23_ATTR

The "INPUT_1_ATTR" through "INPUT_23_ATTR" attributes may be local input values of the twinning object 674. These attributes may align with the present value attribute of AV, BV, or MV objects (e.g., may align with the local inputs 650). The order of inputs can match the order of input values configured in INPUT_LIST_ATTR. The datatype (e.g., a float datatype, an enumerated datatype, etc.) of the INPUT_N_ATTR attribute can vary depending on the mapped input.

GIO_1_ATTR-GIO_23_ATTR

The "GIO_1_ATTR-GIO_23_ATTR" attributes can be reliability values of the twinning object 674 for local values. The attributes can align with a reliability attribute of AV, BV, or MV objects, e.g., the local inputs 650. The order of values of the attributes can match the order of input values configured in INPUT_LIST_ATTR.

OUTPUT_1_ATTR-OUTPUT_23_ATTR

The attributes "OUTPUT_1_ATTR" through "OUTPUT_23_ATTR" can be the output values of the twinning object 674. The local inputs (e.g., the local inputs 650) are combined with shared values received from the network to generate the output values. The order of the outputs can match the order of inputs configured via the INPUT_LIST_ATTR attribute. The datatype of the attributes OUTPUT_1_ATTR-OUTPUT_23_ATTR may vary depending on the mapped attribute. In some embodiments, the datatype is either a float datatype or an enumerated datatype.

GIO_101_ATTR-GIO_123_ATTR

The attribute "GIO_101_ATTR" through "GIO_123_ATTR" may be reliability values for the attributes OUTPUT_1_ATTR-OUTPUT_23_ATTR of the twinning object 674. The twinning object 674 can determine the reliability attributes based on local value reliabilities and/or shared value reliabilities. The order of values may match the order of input values configured in the "INPUT_LIST_ATTR" attribute.

SYSTEM_ENABLED_ATTR

The system enabled attribute can be set to a value which reflects the state of an isolation damper of the AHU 402. The twinning object 674 may stop sharing certain sensor values with the masterless AHU controller system 400 when the isolation damper is closed, i.e., when this attribute is set to false. Points marked to always share and/or have a change of value broadcast rate, can continue to be shared even if the isolation damper is closed, when the system enabled attribute is false. Furthermore, when the enable attribute is false (the isolation damper is closed), the AHU controller 406 may disregard shared values from the network and only use its own local values.

Twinning Object Methods

The twinning object 674 may include various methods or functions which perform the functional features of the twinning object 674 or otherwise the AHU controller 406. Exemplary methods for the twinning object 674 is shown in Table 8.

TABLE 8

| Twinning Object Methods | |
| --- | --- |
| Method Identifier | Method Name |
| CLASSINITIALIZE | twinning Initialize( ) |
| CLASS_START_UP | twinningStartInputs( ) |
| CLASS_FEATURE_START | twinningClassFeatureStart( ) |
| TMR_1_EXPIRED | twinningTimer1( ) |
| TMR_2_EXPIRED | twinningTimer2( ) |
| PROCESS_READ_ATTR_RESP_MSG | twinningReadAttrResponse( ) |
| DIRECT_COV_PROCESS | TwinningDirectCov( ) |
| CLASSVALIDATEOBJECT | twinning Validate( ) |
| CLASS_WRITE_ATTRIBUTE | twinningWrite( ) |

CLASSINITIALIZE

THE IDENTIFIER "CLASSINITIALIZE" MAY IDENTIFY A METHOD "TWINNINGINITIALIZE( )." THIS METHOD CAN INITIALIZE TIMER INDEXES AND INPUT LIST MEMBER VARIABLES OF THE TWINNING OBJECT 674.

CLASS_START_UP

The identifier "CLASS_START_UP" may identify a method "twinningStartInputs( )" The method can processes attributes in the INPUT_LIST_ATTR attribute by sending a read command with a subscription (e.g., a change of value (COV) subscription) to the local inputs 650 for value and reliabilities of the objects of the INPUT_LIST_ATTR (e.g., the step 704 of the process 700). Startup may be delayed until a subscription response for all the local inputs 650 is received.

CLASS_FEATURE_START

The identifier "CLASS_FEATURE_START" may identify a method "twinningClassFeatureStart( )" The method can schedule two timer methods, "twinningTimer1( )" and "twinningTimer2( )" identified by "TMR_2_EXPIRED" and "TMR_2_EXPIRED." The period of the methods for twinningTimer1( )) and twinningTimer2( )) may be defined by the POLL_TIME_1_ATTR attribute and the POLL_TIME_2_ATTR attribute respectively. The first broadcast message containing the objects configured for POLL_RATE_SLOW (e.g., a COV broadcast) can be packaged and sent at the period of the timer methods.

TIME_1_EXPIRED

The identifier "TIME_1_EXPIRED" may identify a method "twinningTimer1( )" that can be scheduled to run on the update rate configured by the "POLL_TIME_1_ATTR" attribute. All local inputs 650 configured for the POLL_RATE_FAST message can be packaged together and transmitted via the network 584 (e.g., broadcast via an unconfirmed COV notification message). The first time the twinningTimer1( )) method is called, all objects configured for the POLL_RATE_FAST setting and POLL_RATE_MEDIUM setting can be packaged together in the a first broadcast message and broadcast via the network 584. The data table generator 528 can be configured to mark stale values as unreliable. The data table generator 528 can mark a value if it has not been updated for within three times the update rate of the value. Old values can be discarded by the data table generator 528 and data table generator 528 can generate new values (e.g., the calculated data table 532) that can be used by the AHU controller 534 to generate outputs. The outputs, e.g., output attributes (e.g., OUTPUT_N_ATTR or GIO_N_ATTR) can be generated based on the new calculated values.

TMR_2_EXPIRED

The identifier "TMR_2_EXPIRED" may identify a method "twinningTimer2( )" The method can be scheduled to run on the update rate configured by POLL_TIME_2_ATTR attribute. All objects configured for POLL_RATE_MEDIUM can be packaged and transmitted via the network 410 based on the twinningTimer2( )) (e.g., broadcast in an unconfirmed COV notification message).

PROCESS_READ_ATTR_RESP_MSG

The identifier "PROCESS_READ_ATTR_RESP_MSG" may identify a method "twinningReadAttrResponse( )" The method can handle an initial read response for the subscription that is made during the startup process (e.g., step 704 of the process 700). A read response value and datatype of the entry can be saved in object data.

DIRECT_COV_PROCESS

An identifier "DIRECT_COV_PROCESS" can identify a function "twinningDirectCov( )" that handles all COV responses for the twinning object 674 (e.g., the step 706 of the process 700). Some COV responses originate locally from the signups on entries in the INPUT_LIST_ATTR (e.g., the step 706 of the process 700). Other COV responses are from the network 410 and can be sent to the twinning object 674 by the SCO 850 (e.g., the step 812 of the process 800).

The method can handle local COV responses by determining an index of the response by matching a source OID and attribute to an entry in the INPUT_LIST_ATTR. The method can update a local value or reliability. Furthermore, the method can update the local input attribute (INPUT_N_ATTR or GIO_N_ATTR). If the COV is for an object marked as POLL_RATE_SLOW, a broadcast message (e.g., an unconfirmed COV notification) can sent containing all values with the POLL_RATE_SLOW designation to the network 540.

The method can handle COV response received via the network 410 by determining a group ID based on the data in the broadcast messages. If the group ID of the message does not match the group ID of the AHU controller 406, the method can discard messages that do not include the matching group ID. The method can determine the device that broadcast the message by examining the data in the message. If a broadcast message includes a device ID that matches the controller device ID, the message can be discarded. The method can process remaining values and reliabilities included in the message, and update the calculated data table 532 based on the received message (e.g., based on the group data table 514). Furthermore, the method can process the data of the group data table 514, identify and discard stale values (e.g., a value that has not been updated since three times its update rate), determine output values and reliabilities for each changed entry in the table, and generate output attributes, e.g., (OUTPUT_N_ATTR or GIO_N_ATTR).

CLASSVALIDATEOBJECT

The identifier "CLASSVALIDATEOBJECT" may identify a method "twinningValidate( )" This method can allow the twinning object 674 to examine write requests and reject them if necessary. For example, writes to the device number attribute can be blocked when in BACnet MSTP mode. The device number may come from a device MAC address when in BACnet MSTP mode.

CLASS_WRITE_ATTRIBUTE

An identifier "CLASS_WRITE_ATTRIBUTE" may identify a method "twinningWrite( )" which can detect when the group ID or device ID (e.g., device number) are changed by the user. Changes to either of these values flush shared data from the twinning object 674) (e.g., flush the group data table 514) to ensure calculations are not performed on invalid data.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A masterless building device system for controlling an environmental condition of a building, the system comprising:
    a first building device comprising a first processing circuit configured to:
        determine, via a first sensor of the first building device, a first environmental condition value of the environmental condition;
        broadcast the first environmental condition value to a second building device via a network;
        receive, via the network, a second environmental condition value broadcast by the second building device;
        generate a calculated environmental condition value based on the first environmental condition value and the second environmental condition value; and
        control the environmental condition based on the calculated environmental condition value; and
    the second building device comprising a second processing circuit configured to:
        determine, via a second sensor of the second building device, the second environmental condition value of the environmental condition;
        broadcast the second environmental condition value to the first building device via the network;
        receive, via the network, the first environmental condition value broadcast by the first building device;
        generate the calculated environmental condition value based on the first environmental condition value and the second environmental condition value; and
        control the environmental condition based on the calculated environmental condition value.

2. The system of claim 1, wherein the first processing circuit is configured to generate the calculated environmental condition value by averaging the first environmental condition value and the second environmental condition value.

3. The system of claim 1, wherein the network is a token network wherein a token is passed between the first processing circuit and the second processing circuit, wherein the first processing circuit and the second processing circuit are configured to broadcast messages on the network in response to receiving the token;
    wherein the first processing circuit is configured to broadcast the first environmental condition value to the second building device via the network by:
        marking a message comprising the first environmental condition value as high priority and adding the message to a message queue comprising a plurality of other messages;
        receiving the token via the network;
        broadcasting the message via the network before broadcasting the plurality of other messages via the network in response to determining that the message is marked as high priority and in response to receiving the token.

4. The system of claim 1, wherein the first processing circuit is configured to receive, via the network, the second environmental condition value broadcast by the second building device by:
    receiving the second environmental condition value of the second building device via a broadcast; and
    determining whether a group identifier of the broadcast matches a group identifier of the first building device;
    wherein the first processing circuit is configured to generate the calculated environmental condition value based on the second environmental condition value in response to determining that the group identifier of the broadcast matches the group identifier of the first building device.

5. The system of claim 1, wherein the first building device is a first air handler unit (AHU) and the second building device is a second AHU.

6. The system of claim 5, wherein the first processing circuit is configured to:
    receive an indication that the first AHU has been activated;
    receive, via the network, a supply fan amount broadcast by the second AHU;

generate a calculated supply fan amount based on the received supply fan amount and one or more other supply fan amounts received from other AHUs;

ramp a speed of a supply fan of the first AHU to the calculated supply fan amount over a time period without performing a control process; and perform the control process in response to determining that the speed of the supply fan has reached the calculated supply fan amount.

7. The system of claim 1, wherein the first processing circuit is configured to:

receive a first setpoint value for the environmental condition and generate a timestamp for the first setpoint value based on a time at which the first setpoint value is received;

broadcast the first setpoint value to the second building device via the network;

receive, via the network a second setpoint value broadcast by the second building device and generate a second timestamp for the second setpoint based on a time at which the second setpoint value is received; and select a most recent setpoint value from the first setpoint value and the second setpoint value based on the first time stamp of the first setpoint value and the second timestamp of the second setpoint values;

wherein the first processing circuit is configured to control an actuator of the first building device to control the environmental condition based on the calculated environmental condition value and the selected most recent setpoint value.

8. The system of claim 7, wherein the environmental condition comprises a pressure of a supply duct of the building and the setpoint comprises a supply duct pressure setpoint;

wherein the first building device is a first roof top unit (RTU) located on a rooftop of the building and the second building device is a second RTU located on the rooftop of the building.

9. A first building device of a building for operating in a masterless building device system comprising one or more second building devices, the first building device comprising:

an actuator configured to control an environmental condition of the building;

a sensor configured to sense the environmental condition of the building; and a controller comprising a processing circuit configured to:

determine, via the sensor, a first environmental condition value of the environmental condition;

broadcast the first environmental condition value to the one or more second building devices via a network, wherein the one or more second building devices are each configured to control the environmental condition based on the broadcasted first environmental condition value;

receive, via the network, one or more second environmental condition values broadcast by the one or more second building devices;

generate a calculated environmental condition value based on the first environmental condition value and the one or more second environmental condition values; and control the actuator based on the calculated environmental condition value to control the environmental condition of the building.

10. The first building device of claim 9, wherein the processing circuit is configured to generate the calculated environmental condition value by averaging the first environmental condition value and the received one or more second environmental condition values broadcast by the one or more second building devices.

11. The first building device of claim 9, wherein the processing circuit is configured to broadcast the first environmental condition value to the one or more second building devices via the network by broadcasting the first environmental condition values at a broadcast rate, wherein the broadcast rate is the same as or less than a control process execution rate, wherein the control process execution rate indicates the rate at which the processing circuit is configured to generate a control output for controlling the actuators based on the calculated environmental condition value.

12. The first building device of claim 9, wherein the processing circuit is configured to:

generate a time stamp for each of the one or more second environmental condition values based on when each of the one or more second environmental condition values is received;

determine whether the received one or more second environmental condition values are reliable based on whether a predefined length of time has passed since receiving the one or more second environmental condition values determined based on the time stamp for each of the one or more second environmental condition values, wherein the one or more reliable second environmental condition values are the one or more second environmental condition values for which the predefined length of time has not passed; and generate the calculated environmental condition value based on the first environmental condition value and the one or more reliable second environmental condition values.

13. The first building device of claim 9, wherein the processing circuit is configured to broadcast the first environmental condition value to the one or more second building devices via the network without transmitting the first environmental condition value directly to the one or more second building devices based on addresses of the one or more second building devices;

wherein the processing circuit is configured to broadcast the first environmental condition value to the one or more second building devices with a group identifier, wherein the group identifier identifies a group of building devices comprising the first building device and the one or more second building devices, wherein the group identifier differentiates the broadcast from other communication messages of the network of other systems.

14. The first building device of claim 9, wherein the one or more second building devices receive the broadcasted first environmental condition value at substantially the same time.

15. The first building device of claim 9, wherein the first building device is a first air handler unit (AHU), the controller is an AHU controller, the actuator is an AHU actuator, and the sensor is an AHU sensor;

wherein the one or more second building devices are one or more second AHUs, wherein the first AHU and the one or more second AHUs are configured to simultaneously control a supply duct of the building.

16. The first building device of claim 15, wherein the AHU actuator comprises a supply fan connected to the supply duct;

wherein the processing circuit is configured to:
receive an indication that the AHU controller has been activated;
receive, via the network, one or more supply fan amounts broadcast by the one or more second AHUs;
generate a calculated supply fan amount based on the received one or more supply fan amounts;
ramp a speed of the supply fan to the calculated supply fan amount over a time period without performing a control process of the AHU controller; and
perform the control process of the AHU controller in response to determining that the speed of the supply fan has reached the calculated supply fan amount.

17. The first building device of claim 16, wherein the processing circuit is configured to:
receive a first setpoint value for the environmental condition and generate a timestamp for the first setpoint value based on a time at which the first setpoint value is received;
broadcast the first setpoint value to the one or more second AHUs via the network;
receive, via the network one or more second setpoint values broadcast by the one or more second AHUs and generate one or more timestamps for each of the one or more second setpoints based on a time at which the one or more second setpoint values are received; and
select a most recent setpoint value from the first setpoint value and the one or more second setpoint values based on the time stamp of the first setpoint value and the one or more timestamps of the one or more second setpoint values of the one or more second AHUs;
wherein the processing circuit is configured to control the AHU actuator to control the environmental condition based on the calculated environmental condition value and the selected most recent setpoint value.

18. A method for controlling an environmental condition of a building by a first building device of a masterless building device system, wherein the method comprises:
determining, by the first building device via a sensor of the first building device, a first environmental condition value of the environmental condition;
broadcasting, by the first building device, the first environmental condition value to one or more second building devices of the masterless building device system via a network, wherein the one or more second building devices are each configured to control the environmental condition based on the broadcasted first environmental condition value;
receiving, by the first building device via the network, one or more second environmental condition values broadcast by the one or more second building devices;
generating, by the first building device, a calculated environmental condition value based on the first environmental condition value and the one or more second environmental condition values; and
controlling, by the first building device, an actuator of the first building device based on the calculated environmental condition value to control the environmental condition of the building.

19. The method of claim 18, further comprising:
generating, by the first building device, a time stamp for each of the one or more second environmental condition values based on when each of the one or more second environmental condition values is received;
determining, by the first building device, whether the received one or more second environmental condition values are reliable based on whether a predefined length of time has passed since receiving the one or more second environmental condition values determined based on the time stamp for each of the one or more second environmental condition values, wherein the one or more reliable second environmental condition values are the one or more second environmental condition values for which the predefined length of time has not passed; and
generating, by the first building device, the calculated environmental condition value based on the first environmental condition value and the one or more reliable second environmental condition values.

20. The method of claim 18, further comprising:
receiving, by the first building device, an indication that the first building device has been activated;
receiving, by the first building device via the network, one or more supply fan amounts broadcast by the one or more second building devices;
generating, by the first building device, a calculated supply fan amount based on the received one or more supply fan amounts;
ramping, by the first building device, a speed of the supply fan to the calculated supply fan amount over a time period without performing a control process; and
performing, by the first building device, the control process in response to determining that the speed of the supply fan has reached the calculated supply fan amount.

* * * * *